(12) United States Patent
Su et al.

(10) Patent No.: US 12,361,971 B2
(45) Date of Patent: Jul. 15, 2025

(54) DEEP LEARNING-BASED VIDEO EDITING METHOD, RELATED DEVICE, AND STORAGE MEDIUM

(71) Applicant: Tencent Technology (Shenzhen) Company Limited, Guangdong (CN)

(72) Inventors: Ye Su, Shenzhen (CN); Wei Dong, Shenzhen (CN); Xuyuan Xu, Shenzhen (CN); Peicheng Zhang, Shenzhen (CN); Yexin Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 130 days.

(21) Appl. No.: 17/972,192

(22) Filed: Oct. 24, 2022

(65) Prior Publication Data
US 2023/0049135 A1  Feb. 16, 2023

Related U.S. Application Data

(63) Continuation of application No. PCT/CN2022/078930, filed on Mar. 3, 2022.

(30) Foreign Application Priority Data

Mar. 4, 2021  (CN) .............................. 202110243565

(51) Int. Cl.
*G11B 27/031* (2006.01)
*G06T 7/00* (2017.01)
*G06V 40/16* (2022.01)

(52) U.S. Cl.
CPC .......... *G11B 27/031* (2013.01); *G06T 7/0002* (2013.01); *G06V 40/168* (2022.01);
(Continued)

(58) Field of Classification Search
CPC ................ G11B 27/031; G06T 7/0002; G06T 2207/20081; G06T 2207/30168;
(Continued)

(56) References Cited

U.S. PATENT DOCUMENTS 10,096,169 B1   10/2018   Chenillo et al.
10,692,480 B2   6/2020    Yao et al.
(Continued)

FOREIGN PATENT DOCUMENTS

CN   106650655 A   5/2017
CN   106899809 A   6/2017
(Continued)

OTHER PUBLICATIONS

English Translation of Chinese Publication CN107566907 (Year: 2018).*
(Continued)

*Primary Examiner* — Loi H Tran
(74) *Attorney, Agent, or Firm* — Crowell & Moring LLP

(57) ABSTRACT

A deep learning-based video editing method can allow for automated editing of a video, reducing or eliminating user input, saving time and labor investments, and thereby improving video editing efficiency. Attribute recognition is performed on an object in a target video using a deep learning model. A target object is selected that satisfies an editing requirement of the target video. A plurality of groups of pictures associated with the target object from the target video are obtained using editing. An edited video corresponding to the target video is generated using the plurality of groups of pictures.

20 Claims, 11 Drawing Sheets

(52) U.S. Cl.
CPC ............... *G06T 2207/20081* (2013.01); *G06T 2207/30168* (2013.01)

(58) Field of Classification Search
CPC ...... G06V 40/168; G06V 10/82; G06V 20/49; H04N 5/262; G06N 3/045; G06N 3/08; G06N 20/00
USPC ........................................................ 386/278
See application file for complete search history.

(56) References Cited

U.S. PATENT DOCUMENTS

| | | | | |
|---|---|---|---|---|
| 2012/0014604 | A1* | 1/2012 | Gaubatz | G06T 7/136 382/190 |
| 2015/0131973 | A1* | 5/2015 | Rav-Acha | G11B 27/02 386/285 |
| 2015/0147045 | A1 | 5/2015 | Birnkrant | |
| 2015/0243325 | A1 | 8/2015 | Pacurariu et al. | |
| 2015/0248745 | A1* | 9/2015 | Chen | G06T 7/593 382/154 |
| 2018/0295427 | A1* | 10/2018 | Leiberman | H04N 21/8456 |
| 2021/0073577 | A1* | 3/2021 | Huang | G06F 18/2411 |
| 2021/0124929 | A1* | 4/2021 | Chae | H04N 23/69 |
| 2022/0199121 | A1 | 6/2022 | Jiang et al. | |
| 2022/0284691 | A1* | 9/2022 | Chen | G06V 10/54 |

FOREIGN PATENT DOCUMENTS

| | | |
|---|---|---|
| CN | 107169430 A | 9/2017 |
| CN | 107566907 A | 1/2018 |
| CN | 108769733 A | 11/2018 |
| CN | 108900896 A | 11/2018 |
| CN | 109257545 A | 1/2019 |
| CN | 109819338 A | 5/2019 |
| CN | 110175546 A | 8/2019 |
| CN | 110611846 A | 12/2019 |
| CN | 113709384 A | 11/2021 |
| JP | 2020-024478 A | 2/2020 |
| WO | WO 2022/184117 A1 | 9/2022 |

OTHER PUBLICATIONS

English Translation of Chinese Publication CN105631430 (Year: 2016).*
International Search Report and Written Opinion for priority application No. PCT/CN2022/078930 dated May 18, 2022, 14p, in Chinese language, with English language translation of the International Search Report.

* cited by examiner

DEEP LEARNING-BASED VIDEO EDITING METHOD, RELATED DEVICE, AND STORAGE MEDIUM

RELATED APPLICATION

This application claims priority as a continuation to PCT/CN2022/078930, filed Mar. 3, 2022, published as WO2022184117A1, and entitled "DEEP LEARNING-BASED VIDEO CLIPPING METHOD, RELATED DEVICE, AND STORAGE MEDIUM," which claims priority to Chinese Patent Application No. 202110243565.2, entitled "DEEP LEARNING-BASED VIDEO EDITING METHOD, RELATED DEVICE, AND STORAGE MEDIUM" filed on Mar. 4, 2021, each of which are incorporated herein by reference in their entirety.

FIELD OF THE TECHNOLOGY

This disclosure relates to the field of internet technologies, and specifically, to video editing.

BACKGROUND OF THE DISCLOSURE

With the continuous development of mobile internet, short videos have become a more prevalent type of content in recent years, and with the popularization of short videos, a requirement of people in daily life for quickly and conveniently obtaining more information is beneficial. A short video refers to an edited video with a relatively short playing duration generated by performing video processing such as segmentation, merging, and secondary encoding on a target video through software.

At present, a manner of obtaining a short video (or an edited video) through editing is generally that a user first watches video content of an entire target video, then after becoming more familiar with the video content, the user crops a plurality of video segments from the target video according to a requirement thereof using video editing software, and the user finally splices the plurality of video segments to obtain an edited video.

However, this video editing manner requires high labor costs, and may require relatively high time investments for video editing since the user invests significant time to be familiar with the video content. As a result, video editing efficiency is relatively low.

SUMMARY

Embodiments of this disclosure provide a deep learning-based video editing method, a related device, and a storage medium, which can automatically edit videos, thereby saving time costs and labor costs, and further improve video editing efficiency.

According to some embodiments a deep learning-based video editing method is provided, including:
  invoking a deep learning model to perform attribute recognition on an object included in a target video to obtain attribute information of the object, the deep learning model being a model having an attribute recognition capability and obtained by performing model training through a deep learning technology;
  selecting, according to the attribute information of the object, a target object satisfying an editing requirement from the object included in the target video; and
  obtaining a plurality of groups of pictures associated with the target object from the target video through editing, and generating an edited video corresponding to the target video by using the plurality of groups of pictures.

According to some embodiments a deep learning-based video editing apparatus is provided, including:
  a recognition unit, configured to invoke a deep learning model to perform attribute recognition on an object included in a target video to obtain attribute information of the object, the deep learning model being a model having an attribute recognition capability and obtained by performing model training through a deep learning technology;
  a processing unit, configured to select, according to the attribute information of the object, a target object satisfying an editing requirement from the object included in the target video; and
  the processing unit being further configured to obtain a plurality of groups of pictures associated with the target object from the target video through editing, and generate an edited video corresponding to the target video by using the plurality of groups of pictures.

According to some embodiments a computer device is provided, including an input interface and an output interface, and further including:
  a processor, adapted to implement one or more instructions; and
  a computer storage medium, storing one or more instructions, the one or more instructions being adapted to be loaded by the processor to perform the deep learning-based video editing method according to the foregoing examples.

According to some embodiments a computer storage medium, storing one or more instructions is provided, the one or more instructions being adapted to be loaded by a processor to perform the deep learning-based video editing method according to the foregoing examples.

In the embodiments of this disclosure, for a to-be-edited target video, attribute recognition may be performed on an object included in the target video by invoking a deep learning model, to relatively accurately obtain attribute information of the object included in the target video. Therefore, a target object satisfying an editing requirement may be relatively accurately selected according to the attribute information of the object included in the target video, a plurality of groups of pictures associated with the target object are automatically obtained from the target video through editing, and an edited video corresponding to the target video may be automatically generated by using the plurality of groups of pictures. A video may be automatically edited using a deep learning technology. In an entire video editing process, no user needs to participate in the process, so that time costs and labor costs may be effectively saved, thereby effectively improving the video editing efficiency.

DESCRIPTION OF EMBODIMENTS

Figure 1A:
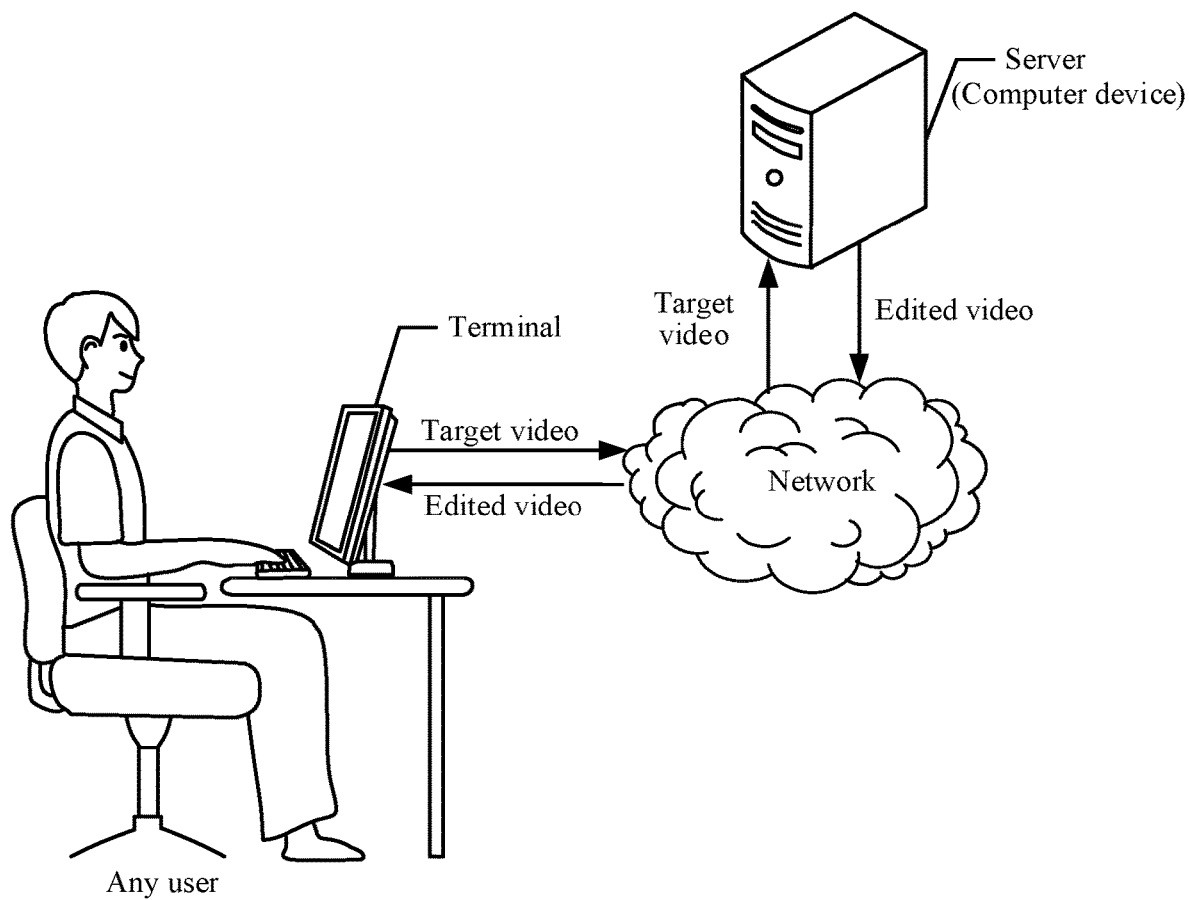
FIG. 1a is a schematic diagram of an example interaction between a terminal and a server according to an embodiment of this disclosure.

The following describes the objectives and technical solutions in the embodiments of this disclosure with reference to the accompanying drawings.

With the continuous development of internet technologies, an artificial intelligence (AI) technology is also well developed. The AI technology is a theory, a method, a technology, and an application system that use a digital computer or a machine controlled by the digital computer to simulate, extend, and expand human intelligence, perceive an environment, acquire knowledge, and use the knowledge to obtain an optimal result. In other words, AI is a comprehensive technology in computer science and mainly understands the essence of intelligence and produces a new intelligent machine that can react in a manner similar to human intelligence, so that the intelligent machine has various functions such as sensing, reasoning, and decision. Correspondingly, the AI technology is a comprehensive subject, which mainly include several major directions such as a computer vision (CV) technology, a speech processing technology, a natural language processing technology, and machine learning (ML)/deep learning.

The CV technology is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific subject, the CV studies related theories and technologies, and attempts to establish an AI system that can obtain information from images or multidimensional data. The CV technology generally includes technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further includes biometric feature recognition technologies such as common face recognition and fingerprint recognition.

The ML is a multi-field interdisciplinary subject involving the probability theory, statistics, the approximation theory, convex analysis, the algorithm complexity theory, and the like. The ML specializes in studying how a computer simulates or implements a human learning behavior to acquire new knowledge or skills, and reorganize an existing knowledge structure, so as to keep improving its performance. The ML is the core of AI and is a basic way to make a computer device intelligent. The ML is a multi-field interdisciplinary subject involving the probability theory, statistics, the approximation theory, convex analysis, the algorithm complexity theory, and the like. The ML specializes in studying how a computer device simulates or implements a human learning behavior to acquire new knowledge or skills, and reorganize an existing knowledge structure, so as to keep improving its performance. The deep learning is a technology that uses a deep neural network system to perform machine learning. The ML/deep learning may generally include technologies such as an artificial neural network, a belief network, reinforcement learning (RL), transfer learning, inductive learning, and learning from demonstrations.

Based on the CV technology and the ML/deep learning technologies in the AI technology mentioned above, some embodiments of this disclosure provide a video editing solution to automatically edit videos, thereby improving the video editing efficiency. In an example implementation, the video editing solution may be performed by a computer device, and the computer device may be a terminal or a server. The terminal may include, but not limited to, a smartphone, a tablet computer, a notebook computer, a desktop computer, or a smart television. Various applications (APPs) may be run in the terminal, such as a video playing APP, a social APP, a browser APP, an information flow APP, or an education APP. The server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an AI platform. It is to be understood that, as shown in FIG. 1a, when the computer device is a server, when any user performs video editing, the user may upload a to-be-edited target video to the computer device (namely, the server) through any terminal, so that the computer device performs editing processing on the target video by using the video editing solution to obtain an edited video.

Figure 1B:
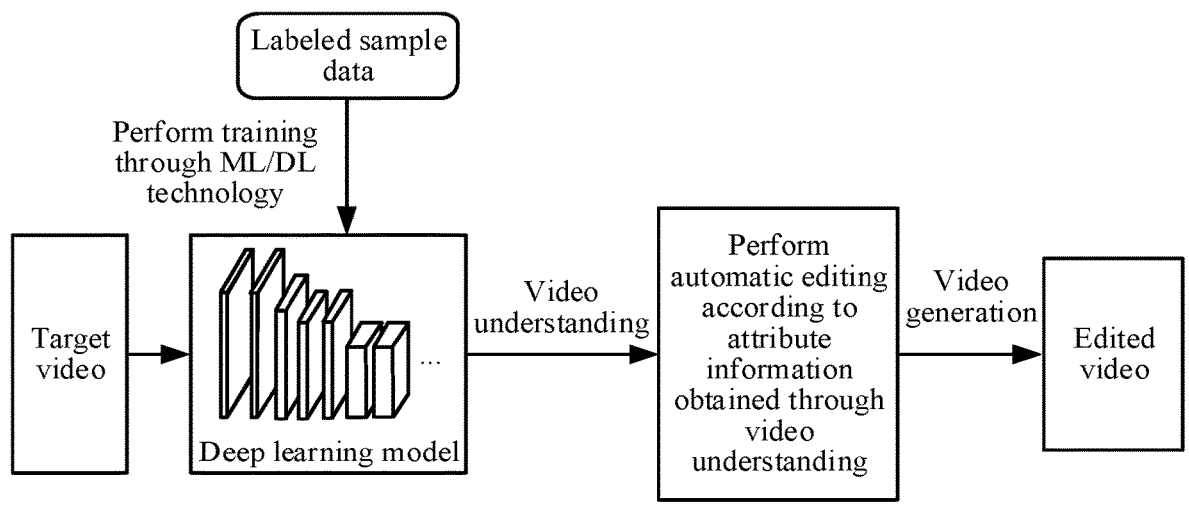
FIG. 1b is a schematic diagram of an example video editing solution according to an embodiment of this disclosure.

Referring to FIG. 1B, a general principle of the video editing solution may be as follows: the computer device first obtains a deep learning model having an attribute recognition capability through training by using the ML/deep learning technologies. It may be understood that, the deep learning model essentially is an attribute recognition model. The attribute recognition model refers to a mathematical model obtained by performing learning and training on labeled sample data (for example, a correspondence between sample pictures and specified attribute tags) based on the ML/deep learning technologies, and a model parameter of the mathematical model may be obtained during the learning and training process, so that a probability that each object in inputted data includes an attribute within a specified range may be calculated by loading the model parameter during subsequent recognition and prediction. When video editing is performed on the target video, the computer device may first perform video understanding on the target video through the deep learning model, to determine an object included in the target video and attribute information of the object. The computer device may then automatically obtain a plurality of frames of pictures or a plurality of video sub-segments associated with a target object and satisfying an editing requirement from the target video through editing according to the attribute information of the object. Finally, the computer device may directly obtain an edited video by splicing the plurality of frames of pictures or the plurality of video sub-segments obtained through editing; or the computer device may perform, by using suitable music, background music adding and video splicing processing on the plurality of frames of pictures or the plurality of video sub-segments obtained through editing to obtain an edited video.

As can be seen, according to the video editing solution provided in the embodiments of this disclosure, in a case without any manual intervention, a plurality of frames of pictures or a plurality of video sub-segments can be intelligently selected from the target video according to the deep learning technology and the editing requirement, so that an edited video without background music or an edited video with suitable background music can be automatically obtained through editing. According to this automatic editing manner, time costs and labor costs may be effectively saved, thereby effectively improving the video editing efficiency. In addition, as the editing requirement differs, the target object selected by the computer device may also differ, and the generated edited video may further differ. Therefore, by setting a plurality of different editing requirements, types of edited videos may be further enriched, thereby effectively improving the variety generated through editing.

Figure 2:
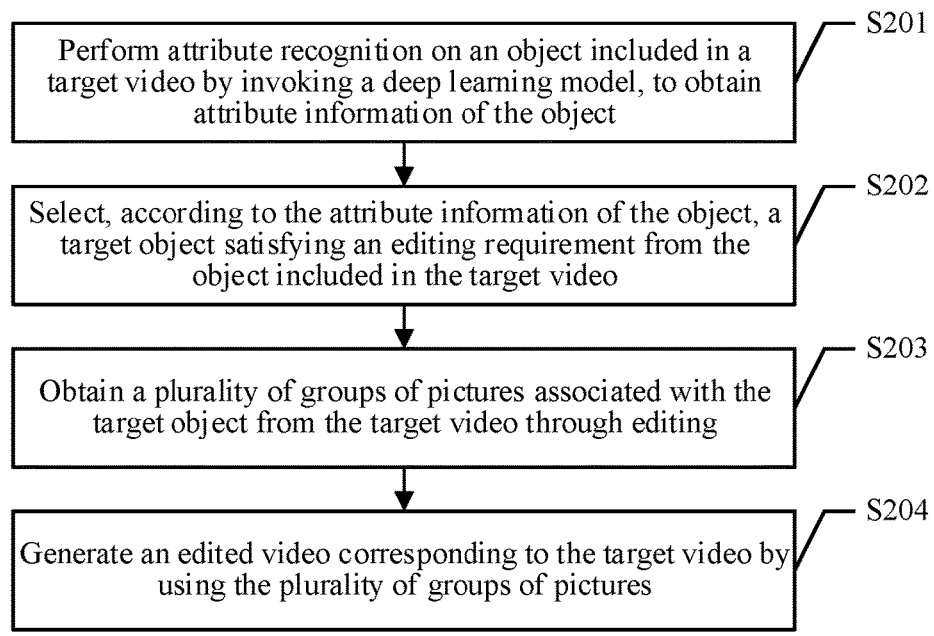
FIG. 2 is a schematic flowchart of an example video editing method according to an embodiment of this disclosure.

Based on the related description of the video editing solution, some embodiments of this disclosure provide a deep learning-based video editing method, and the video editing method may be performed by the computer device mentioned above. Referring to FIG. 2, the video editing method may include the following steps S201 to S204:

S201. Perform attribute recognition on an object included in a target video by invoking a deep learning model, to obtain attribute information of the object.

Before S201 is performed, a target video and an editing requirement for the target video may be further obtained.

In an example implementation process, a user may transmit a video editing request to the computer device, to request the computer device to perform video editing on the target video; and correspondingly, the computer device may obtain the target video according to the video editing request. In an implementation, the video editing request may be a vid request, and the vid refers to a video file stream media format without sound. In this implementation, the target video may be a video without sound, namely, the target video may be understood as including a consecutive picture sequence formed by a plurality of frames of pictures. In another implementation, the video editing request may be a vid+wav request, and the way refers to a standard digital audio file. In this implementation, the target video may be a video with sound, namely, the target video may be understood as simultaneously including a consecutive picture sequence formed by a plurality of frames of pictures and a piece of audio data.

It is to be understood that, the target video mentioned above may be a video of any type, such as a television video, a variety show video, a we media video, or a game video. The television video refers to a video manufactured by recording a performance process of characters and/or animals and a surrounding environment according to a script made in advance in a specified photographing scene and adding audio and special effects in a later stage. The variety show video refers to an entertaining video combining a plurality of art forms. The we media video refers to a video obtained by a common people photographing a scene through a photographing device and published outward through a network, such as a video blog (vlog). The game video refers to a game screen displayed in a screen of a terminal of any game player in a process that one or more game players play a target game, or a video generated by performing screen recording on a game screen displayed in a screen of a terminal of a watch user watching the game process of the game player.

The target video may include an object, for example, may include one or more objects, and the object mentioned herein may be determined according to a type of the target video. For example, when the target video is a television video, a variety show video, or a we media video, the object in the target video may be any one of the following: a character, an animal, or a building; and when the target video is a game video, the object in the target video may be a virtual character object in a game. For ease of description, the following is described by using an example in which the object is a character.

In addition to obtaining the target video, the computer device may further obtain the editing requirement for the target video. The editing requirement may be determined according to an editing objective set by the user when the video editing request is transmitted, may be determined by the computer device according to any preset editing objective, or other suitable way. The editing objective is used for indicating an intention of editing the target video into an edited video of a target type, and the target type herein may include any one of the following: a role collection type, a CP collection type, an action consistency type, and a role emotion orientation type. The following describes some definitions of edited videos of various types respectively:

An edited video of a role collection type refers to a video formed by splicing a plurality of groups of pictures including a same main role. The main role mentioned herein refers to an object whose object frequency is higher than a frequency threshold or an object having a highest object frequency in the target video. The object frequency refers to a number of times that the object appears in the target video, and for example, if an object A appears in the target video for 100 times, an object frequency of the object A is 100. Correspondingly, if the editing objective is used for indicating an intention of editing the target video into an edited video of a role collection type, the editing requirement may be used for instructing to select an object whose object frequency is higher than the frequency threshold or select an object having the highest object frequency. The frequency threshold herein may be set according to experience or a service requirement, and for example, the frequency threshold may be set to 500.

An edited video of a CP collection type refers to a video formed by splicing a plurality of groups of pictures including a same hot CP. The hot CP mentioned herein refers to a CP whose occurrence times is greater than a times threshold or a CP having a highest occurrence times in the target video. The CP refers to an object pair formed by two objects, for example, a lover pair formed by two objects with different genders and having a lover relationship, or a sister pair/brother pair formed by two objects with a same gender and having a friend relationship. Correspondingly, if the editing objective is used for indicating an intention of editing the target video into an edited video of a CP collection type, the editing requirement may be used for instructing to select a CP whose occurrence times is greater than the times threshold or a CP having the highest occurrence times. The times threshold herein may be set according to experience or a service requirement, and for example, the times threshold may be set to 200.

An edited video of an action consistency type refers to a video formed by splicing various groups of pictures of at least one object performing a same action. The same action mentioned herein may be said for one object, or may be said for a plurality of objects. When the same action is said for one object, the same action may be a common action performed by the object at different moments, or may be a preset action performed by the object at different moments. When the same action is said for a plurality of objects, the same action may be a common action performed by the objects or may be a preset action performed by the objects. Correspondingly, if the editing objective is used for indicating an intention of editing the target video into an edited video of an action consistency type, the editing requirement may be used for instructing to select an object performing a common action or select an object performing a preset action. The preset action herein may be set as desired, for example, a heart-shaped finger heart action or a dance action performed by the user.

An edited video of a role emotion orientation type refers to a video formed by splicing various groups of pictures of at least one object in a same emotion state. The same emotion state mentioned herein may be said for one object, or may be said for a plurality of objects. When the same emotion state is said for one object, the same emotion state may be a common emotion state had by the object at different moments, or may be a preset emotion state had by the object at different moments. When the same emotion state is said for a plurality of objects, the same emotion state may be a common emotion state had by the objects or may be a preset emotion state had by the objects. Correspondingly, if the editing objective is used for indicating an intention of editing the target video into an edited video of a role emotion orientation type, the editing requirement may be used for instructing to select an object having a common emotion state or select an object having a preset emotion state. The preset emotion state herein may be set as desired, for example, a happy state or a sad state.

The deep learning model is a model having an attribute recognition capability and obtained by performing model training through the deep learning technology. In general cases, the deep learning model may be a model having recognition capabilities such as face recognition, action recognition, and emotion recognition and obtained by performing training on an initial neural network model based on massive labeled sample data by using the ML/deep learning technologies. Attribute recognition is performed on the object included in the target video through the deep learning model, and obtained attribute information of the object may include at least one of the following: facial information, action information (for example, face information), emotion information, and gender information. The facial information of the object may include a plurality of facial features of the object and a facial time mark of each of the plurality of facial features. The facial time mark of each facial feature is used for indicating a picture to which the object belongs when a corresponding facial feature is recognized from the target video. The action information of the object may include a plurality of action features of the object and an action time mark of each of the plurality of action features; and the action time mark of each action feature is used for indicating a picture sub-sequence to which the object belongs when a corresponding action feature is recognized from the target video. The emotion information of the object may include a plurality of emotion features of the object and an emotion time mark of each of the plurality of emotion features. The emotion time mark of each emotion feature is used for indicating a picture to which the object belongs when a corresponding emotion feature is recognized from the target video. Any feature of any user may include a plurality of time marks, and for example, if any object may have a same facial feature (assumed as a facial feature A) in a plurality of frames of pictures (for example, 5 frames of pictures), the facial feature A may include 5 facial time marks. In another example, if any object has a same action feature (assumed as an action feature A) in a plurality of picture sub-sequences (for example, 3 picture sub-sequences), the action feature A may include 2 action time marks.

In some examples, because features such as facial features or emotion features had by a same object in different pictures may be different, when information such as facial information or emotion information of each object is recognized, attribute recognition may be performed by using a picture frame as a unit. Based on this, the deep learning model may include a first model, where the first model is a network model constructed and trained based on a deep convolutional neural network, and configured to perform independent attribute recognition on each frame of picture in the target video. A convolutional neural network (CNN) is a feedforward neural network, which may work by simulating a working mechanism of neurons of a human brain. The CNN generally may include one or more convolution layers and a top fully connected layer, and may also include an association weight and a pooling layer. Through the structure, the CNN can fully utilize a two-dimensional structure of inputted data to perform attribute recognition on the inputted data, to obtain relatively accurate attribute information. Based on related description of the CNN, in the embodiments of this disclosure, a deep CNN shown in FIG. 3a may be constructed, so that the first model may be constructed and trained by using the deep CNN shown in FIG. 3a.

Figure 3A:
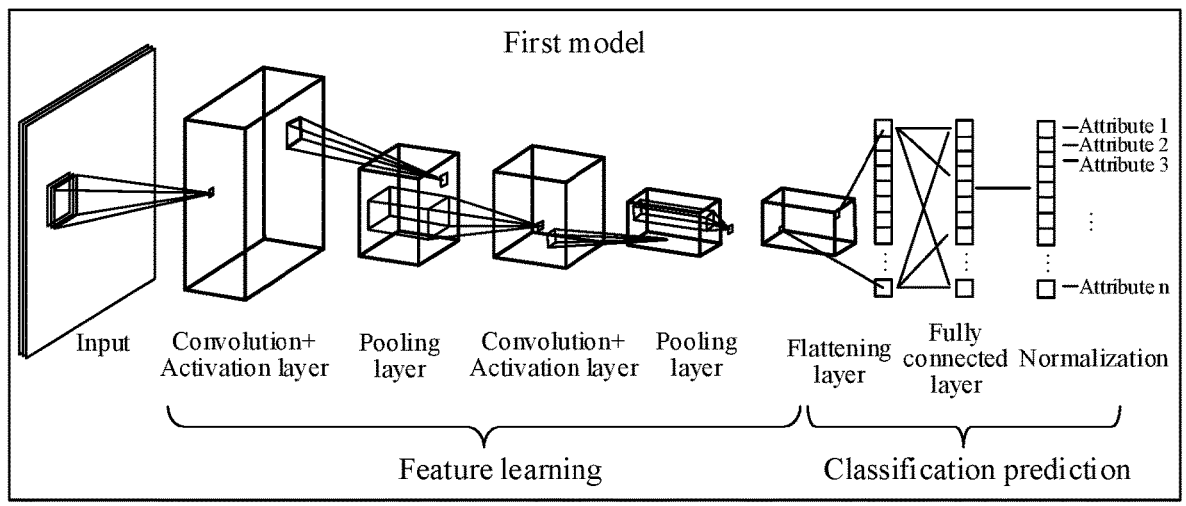
FIG. 3a is a schematic structural diagram of an example first model in a deep learning model according to an embodiment of this disclosure.

Referring to FIG. 3a, the deep CNN may sequentially include an input layer (input), a convolution and activation layer (convolution+relu), a pooling layer (pooling), a convolution and activation layer, a pooling layer, a flatten layer (flatten), a fully connected layer (full connected), and a normalization layer (softmax). The input layer is responsible for receiving a picture. The convolution and activation layer is responsible for performing a convolution operation and an activation operation, where picture features may be extracted through the convolution operation, and the activation operation may assist a network in obtaining non-linear features. The pooling layer is responsible for performing a pooling operation, where salient features may be reserved, redundant information may be removed, and a subsequent calculation amount may be reduced through the pooling operation. The flatten layer is responsible for performing a data flattening operation (namely, converting multidimensional data into one-dimensional data for processing), where a dimension of data may be effectively reduced by the data flattening operation for ease of subsequent data processing. The fully connected layer is responsible for performing a data connection operation, where the data connection operation refers to an operation of integrating a plurality of pieces of feature data to output a value. The normalization layer is responsible for predicting attribute information of each object in the picture and a prediction probability of each piece of attribute information according to an output result of the fully connected layer, so as to output attribute information whose prediction probability is greater than a probability threshold or attribute information having a greatest prediction probability. In the embodiments of this disclosure, the deep CNN is constructed by arranging the convolution and activation layer and the pooling layer in an intersecting manner, so that in a process of constructing and obtaining the first model through training by using the deep CNN, attribute features in each labeled category can be well learned according to the labeled category of the sample data, and the accuracy of attribute recognition may be gradually improved during training, to further obtain a first model with relatively good robustness.

In this case, an implementation of S201 may include: splitting the target video into independent each frame of picture, and sequentially invoking the first model in the deep learning model to perform object attribute recognition on the independent each frame of picture to obtain the attribute information of the object. The object attribute recognition herein may include at least one of the following: face recognition and emotion recognition. Correspondingly, the attribute information of the object obtained by using this implementation may include at least one of the following: facial information and emotion information. That is, the facial information and the emotion information are obtained by the first model through recognition. In a possible situation, because gender information of a same object is unique, the first model may be invoked to perform gender recognition on the independent each frame of picture to obtain gender information of the object, so as to help perform CP recognition subsequently based on the gender information.

Figure 3B:
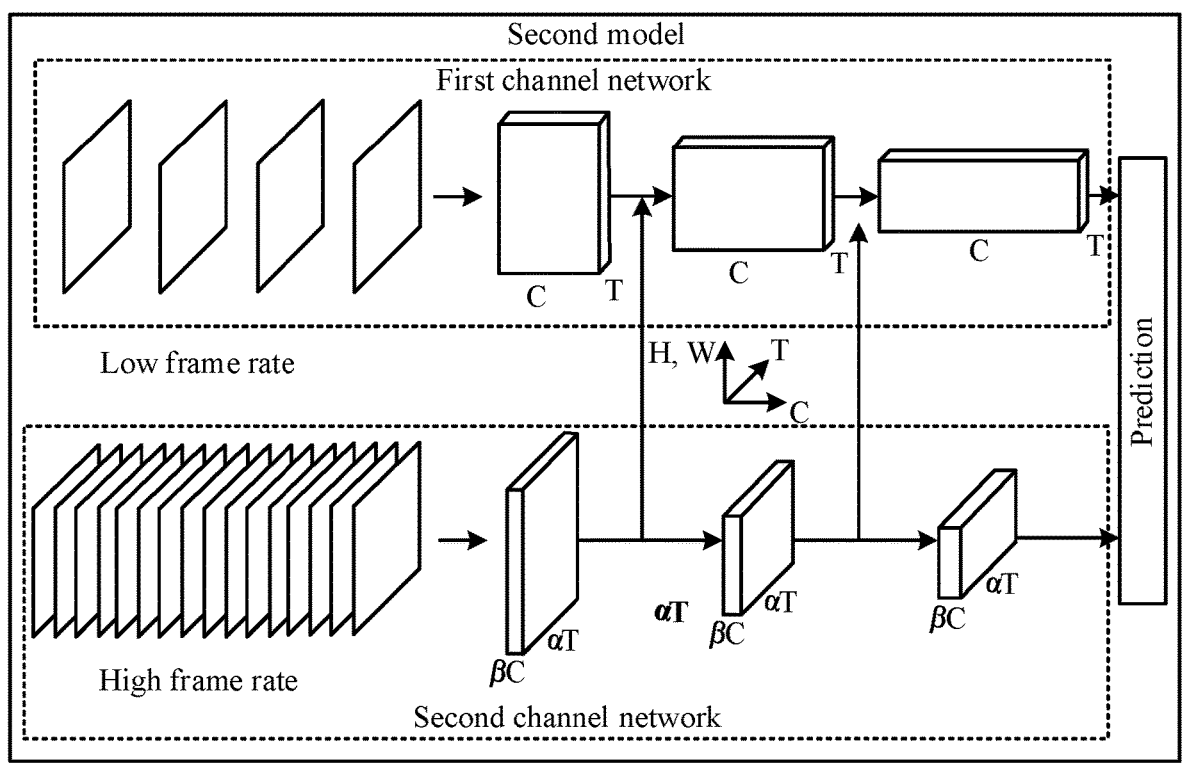
FIG. 3b is a schematic structural diagram of an example second model in a deep learning model according to an embodiment of this disclosure.

In some examples, because an action of the object is generally dynamic and has a motion trajectory, the motion trajectory of the object can be hardly recognized based on a single frame of picture, so that the action of the object can be hardly recognized. Therefore, when recognition is performed on action information of each object, action recognition may be performed by using a picture sequence as a unit. Based on this, the deep learning model may include a second model, and the second model is a slow-fast-combined network model constructed and trained based on a slowfast algorithm (a target slow and fast detection algorithm) and configured to perform action recognition on each picture sub-sequence in the target video. Referring to FIG. 3b, the second model may include a first channel network (low frame rate), a second channel network (high frame rate), and a prediction layer (prediction). An input of the first channel network is a low frame rate first picture sequence, which is used for capturing spatial semantic information and static content; an input of the second channel network is a high frame rate second picture sequence, which is used for capturing motion information and dynamic content; and an input of the prediction layer is an output result of the first channel network and an output result of the second channel network, which is used for performing action prediction according to the two output results, so as to output an action feature obtained through prediction and an action time mark of the action feature. In addition, sizes of a convolution kernel used by the first channel network may be {T, S2, C}, where T, S, and C respectively represent sizes of a time sequence, a space, and a channel; and Sizes of a convolution kernel used by the second channel network may be {αT, S2, βC}, where α represents a velocity ratio (a frame skipping rate), β represents a channel ratio, and values of α and β may be set according to experience. The second channel network has a relatively small channel and is a lightweight network.

In this case, an implementation of S201 may include: splitting the target video into a plurality of picture sub-sequences, where a number of pictures included in each picture sub-sequence may be determined according to a processing capability of the second model. For example, if 64 frames of pictures can be inputted into the second model every time, each picture sub-sequence may include 64 frames of pictures. The second model in the deep learning model may be then invoked to perform object action recognition on the plurality of picture sub-sequences respectively, to obtain the action information of the object. That is, the action information of any object is obtained by the second model through recognition. In some examples, for any picture sub-sequence, frame skipping processing may be performed on the picture sub-sequence to obtain a first picture sequence adapted to the first channel network in the second model, and frame skipping processing may be performed on the picture sub-sequence to obtain a second picture sequence adapted to the second channel network in the second model. Then, the first channel network is invoked to perform convolution processing on the first picture sequence, and the second channel network is invoked to perform convolution processing on the second picture sequence. In addition, after every time the second channel network performs convolution processing, an obtained processing result may be transmitted into the first channel network through a lateral connection, so that the first channel network may know the processing result of the second channel network in time, and may further perform subsequent convolution processing according to the processing result. Finally, the prediction layer may be invoked to perform action prediction according to the output result of the first channel network and the output result of the second channel network, to output an action feature included in the picture sub-sequence.

While service data is growing, all the models such as the first model performing recognition on a single frame of picture and the second model performing recognition on a picture sub-sequence can continuously improve a recognition effect with the assistance of big data. Meanwhile, for each of the models, when a recognition requirement for a new element (namely, a new attribute) occurs, the recognition ability of each of the models may be further quickly iterated by changing the sample data in a label-fine adjustment manner, so that each of the models can better and quickly adapt to a service requirement.

S202. Select, according to the attribute information of the object, a target object satisfying an editing requirement from the object included in the target video.

As can be seen from the above, the attribute information of the object may include at least one of the following: information such as facial information, action information, emotion information, or gender information. The editing requirement may be used for instructing how to perform object selection on the object in the target video. Correspondingly, when the target video includes a plurality of objects, an implementation of S202 may include the following several cases:

When the editing requirement instructs to select an object whose object frequency is higher than a frequency threshold or select an object having a highest object frequency, an object frequency of each of the plurality of objects appearing in the target video may be calculated according to the facial information of the object respectively; and an object whose object frequency is higher than the frequency threshold is then selected from the plurality of objects as a target object; or an object having a highest object frequency is selected from the plurality of objects as the target object. Any object is used as an example, an implementation of calculating an object frequency of each of the plurality of objects in the target video according to the facial information of the object may be: calculating a number of facial time marks included in the facial information of the object, and using the calculated number as the object frequency of the object appearing in the target video.

When the editing requirement instructs to select objects performing a common action or select objects performing a preset action, a first object group may be selected from the plurality of objects according to the action information of the object and objects in the first object group may be used as the target object, where the objects in the first object group perform the common action; or an object performing the preset action may be selected according to the action information of the object from the plurality of objects as the target object. An implementation of selecting a first object group from the plurality of objects according to the action information of the object may be: traversing the plurality of objects sequentially, and performing feature hit matching on action information of other objects other than a current object respectively through action features in the action information of the traversed current object according to an action space alignment rule. The feature hit matching herein refers to processing of searching for, for any action feature of the current object, a feature satisfying the action space alignment rule with the any action feature from action information of other objects. If another object is successfully hit, the current object and the hit another object are added to the first object group; or otherwise, objects that have not been traversed are continuously traversed until all objects are traversed, and the first object group may be obtained in this case. The action space alignment rule mentioned above may include any one of the following: an alignment rule of consistent action features, an alignment rule of consistent action features and consistent action speeds, and an alignment rule of consistent action features, consistent action speeds, and same spatial position when objects performing actions.

When the editing requirement instructs to select objects having a common emotion state or select objects having a preset emotion state, a second object group may be selected from the plurality of objects according to the emotion information of the object and objects in the second object group may be used as the target object, where the objects in the second object group have the common emotion state; or an object having the preset emotion state is selected according to the emotion information of the object from the plurality of objects as the target object.

When the editing requirement instructs to select a CP whose occurrence times is greater than a times threshold or a CP having a highest occurrence times, the attribute information of the any object may further include associated object information, where the associated object information may include an associated object of the any object and an associated time mark corresponding to the associated object. The associated object refers to an object appearing in the same frame of picture with the any object simultaneously, and the associated time mark of the associated object is used for indicating a corresponding frame of picture when the any object and the associated object appear simultaneously. The computer device may further calculate, for any object and according to a number of associated time marks included in the attribute information of the any object, an occurrence times that the any object and associated objects of the any object appear simultaneously, and determine an associated object whose corresponding occurrence times is greater than a preset threshold and the any object as a CP. A plurality of CPs may be obtained by performing processing on the objects respectively according to the calculation method. A CP whose occurrence times is greater than the times threshold or having a highest occurrence times may be selected from the plurality of CPs, and objects in the selected CP may be used as the target object. For any determined CP, a type of the CP may be further determined according to gender information of two objects in the CP. For example, if the gender information of the two objects in the CP is different, the CP may be determined as a lover pair. In another example, if the gender information of the two objects in the CP is the same, the CP may be determined as a sister pair or a brother pair.

S203. Obtain a plurality of groups of pictures associated with the target object from the target video through editing.

During an implementation, the computer device may provide two editing manners: a picture editing manner and a segment editing manner. The picture editing manner refers to a manner of obtaining one frame of picture associated with the target object through editing from the target video every time by using one frame of picture as an editing unit. The segment editing manner refers to a manner of obtaining a video sub-segment associated with the target object through editing from the target video every time by using a video segment as an editing unit. Correspondingly, when S203 is performed, the computer device may select one editing manner from the two editing manners according to an actual requirement or other manner, and obtain the plurality of groups of pictures associated with the target object from the target video through editing by using the selected target editing manner. When the selected target editing manner is the picture editing manner, a plurality of frames of pictures associated with the target object may be obtained by performing an edit operation for a plurality of times. In the case, each of the plurality of groups of pictures includes one frame of picture. When the selected target editing manner is the segment editing manner, a plurality of video sub-segments associated with the target object may be obtained by performing an edit operation for a plurality of times. In the case, each of the plurality of groups of pictures includes one video sub-segment.

When the plurality of groups of pictures associated with the target object are obtained from the target video through editing by using the target editing manner (for example, the picture editing manner of the segment editing manner), the computer device may directly edit the target video by using the target editing manner, to obtain the plurality of groups of pictures associated with the target object through editing. In some examples, it is considered that some low-quality pictures may exist in the target video due to various factors. For example, some cameras may perform photographing at night or some cameras move at a high speed, as a result, some frames of pictures acquired by these cameras in the target video are very blurred, and the target video includes blurred pictures. In another example, the target video may include repeated picture appearing in a short time and causing the user to feel repeated and redundant. In still another example, the target video may include group pictures including a plurality of objects simultaneously and causing the user to feel visually crowded. If editing is directly performed on the target video, the groups of pictures obtained through editing may include the low-quality pictures, which affects the video quality of a finally obtained edited video. Therefore, to improve the reliability and picture quality of the groups of pictures and further improve the video quality of the edited video, the computer device may also first perform low-quality picture detection processing on the target video to obtain the low-quality pictures in the target video, perform low-quality picture filtering processing on the target video to obtain an effective video from which the low-quality pictures are filtered out from the target video, and then obtain the plurality of groups of pictures associated with the target object through editing from the effective video obtained through filtering processing by using the target editing manner.

It is to be understood that, the foregoing are merely example lists picture types that the low-quality pictures possibly include, and a type of the low-quality pictures is determined according to an editing objective. For example, when the editing objective is used for indicating an intention of editing the target video into an edited video of a role collection type, since an edited video of a role collection type is said for a same object, in this case, blurred pictures, repeated pictures, and group pictures may be considered as low-quality pictures. That is, in this case, when low-quality picture filtering is performed on the target video, the blurred pictures, the repeated pictures, and the group pictures may all be filtered out. In another example, when the editing objective is used for indicating an intention of editing the target video into an edited video of a CP collection type, since an edited video of a CP collection type is said for a same CP (namely, two objects), in this case, the blurred pictures and the repeated pictures may be considered as low-quality pictures, and the group pictures may not be considered as low-quality pictures. That is, in this case, when low-quality picture filtering is performed on the target video, the blurred pictures and the repeated pictures may be filtered out, and the group pictures do not need to be filtered out.

When the target object is selected according to the facial information, it indicates that the computer device intends to edit the target video into an edited video of a role collection type, and each group of picture in the plurality of groups of pictures obtained through editing includes the target object. When the target object is selected according to the action information, it indicates that the computer device intends to edit the target video into an edited video of an action consistency type, and the plurality of groups of pictures obtained through editing may include a group of picture including a target object performing a common action or a preset action. For example, it is assumed that a picture A, a picture B, and a picture C in the target video all include the target object, but the target object performs a finger heart action in the picture A, performs a laughter action in the picture B, and performs a head up action in the picture C, if the preset action is the finger heart action, the plurality of groups of pictures may include the picture A. Optionally, the plurality of groups of pictures may further include a group of picture including a first object other than the target object in a first object group and the first object performing the common action or a group of picture including a second object performing the preset action.

When the target object is selected according to the emotion information, it indicates that the computer device intends to edit the target video into an edited video of a role emotion orientation type, and the plurality of groups of pictures obtained through editing may include a group of picture including a target object having a common emotion state or a preset emotion state. For example, it is assumed that a picture A, a picture B, and a picture C in the target video all include the target object, but the target object is in a happy state in the picture A, in a pain state in the picture B, and in a despair state in the picture C, if the preset emotion state is the happy state, the plurality of groups of pictures may include the picture A. Optionally, the plurality of groups of pictures may further include a group of picture including a third object other than the target object in a second object group and the third object having the common emotion state or a group of picture including a fourth object having the preset emotion state. When the target object is selected according to the associated object information, it indicates that the computer device intends to edit the target video into an edited video of a CP collection type, and each group of picture in the plurality of groups of pictures obtained through editing includes a group of picture to which the target object belongs.

S204. Generate an edited video corresponding to the target video by using the plurality of groups of pictures.

In an implementation, splicing processing may be directly performed on the plurality of groups of pictures to obtain the edited video corresponding to the target video. In another implementation, target music may be alternatively obtained and rhythm point location recognition may be performed on the target music to determine rhythm point locations in the target music, rhythm-synchronized splicing processing is then performed on the plurality of groups of pictures according to an interval duration of the rhythm point locations to generate a music rhythm-synchronized video, and the music rhythm-synchronized video is used as the edited video. The music rhythm-synchronized video refers to a video in which picture switching or video segment switching is performed exactly at the rhythm point locations of the music to form a good watching feeling through music-picture combination. During generation of the edited video, crossing of different videos (for example, different films and television dramas) may be further supported. That is, after a plurality of groups of pictures are obtained through editing according to S203, the computer device may further obtain other groups of pictures associated with the target object from other videos through editing according to the editing principle, so as to generate the edited video corresponding to the target video together by using the plurality of groups of pictures and the other groups of pictures. For example, when the editing objective is used for indicating an intention of editing the target video into an edited video of an action consistency type, other groups of pictures including the object performing the common action or the preset action may be further obtained from other videos through editing, and the edited video is generated together by using the other groups of pictures and the plurality of groups of pictures.

The target music is essentially audio data formed by a plurality of time point locations (or referred to as music point locations) and an audio amplitude value of each of the plurality of time point locations. In addition to the attribute of the audio amplitude value, each of the plurality of time point locations may further include attributes such as a sound frequency, energy, a volume, and sound quality. The sound frequency refers to a number of times that an item completes whole vibrations in a single time point location. The volume may be also referred to as a sound intensity or sound loudness, which is a subjective feeling for an intensity of sound heard by a human ear. The sound quality may be also referred to as timbre, which is used for reflecting a feature of sound generated based on the audio amplitude value of each of the plurality of time point locations. Correspondingly, the rhythm point locations in the target music may be also referred to as stress point locations, which may include: energy, a volume, and a time point location at which local sound quality is maximized, and/or energy, a volume, and a time point location at which the sound quality changes suddenly in the target music.

In the embodiments of this disclosure, for a to-be-edited target video, attribute recognition may be performed on an object included in the target video by invoking a deep learning model, to relatively accurately obtain attribute information of the object included in the target video. Therefore, a target object satisfying an editing requirement may be relatively accurately selected according to the attribute information of the object included in the target video, a plurality of groups of pictures associated with the target object are automatically obtained from the target video through editing, and an edited video corresponding to the target video may be automatically generated by using the plurality of groups of pictures. As can be seen, in the embodiments of this disclosure, video may be automatically edited through a deep learning technology. In an entire video editing process, no user needs to participate in the process, so that time costs and labor costs may be effectively saved, thereby effectively improving the video editing efficiency.

Figure 4:
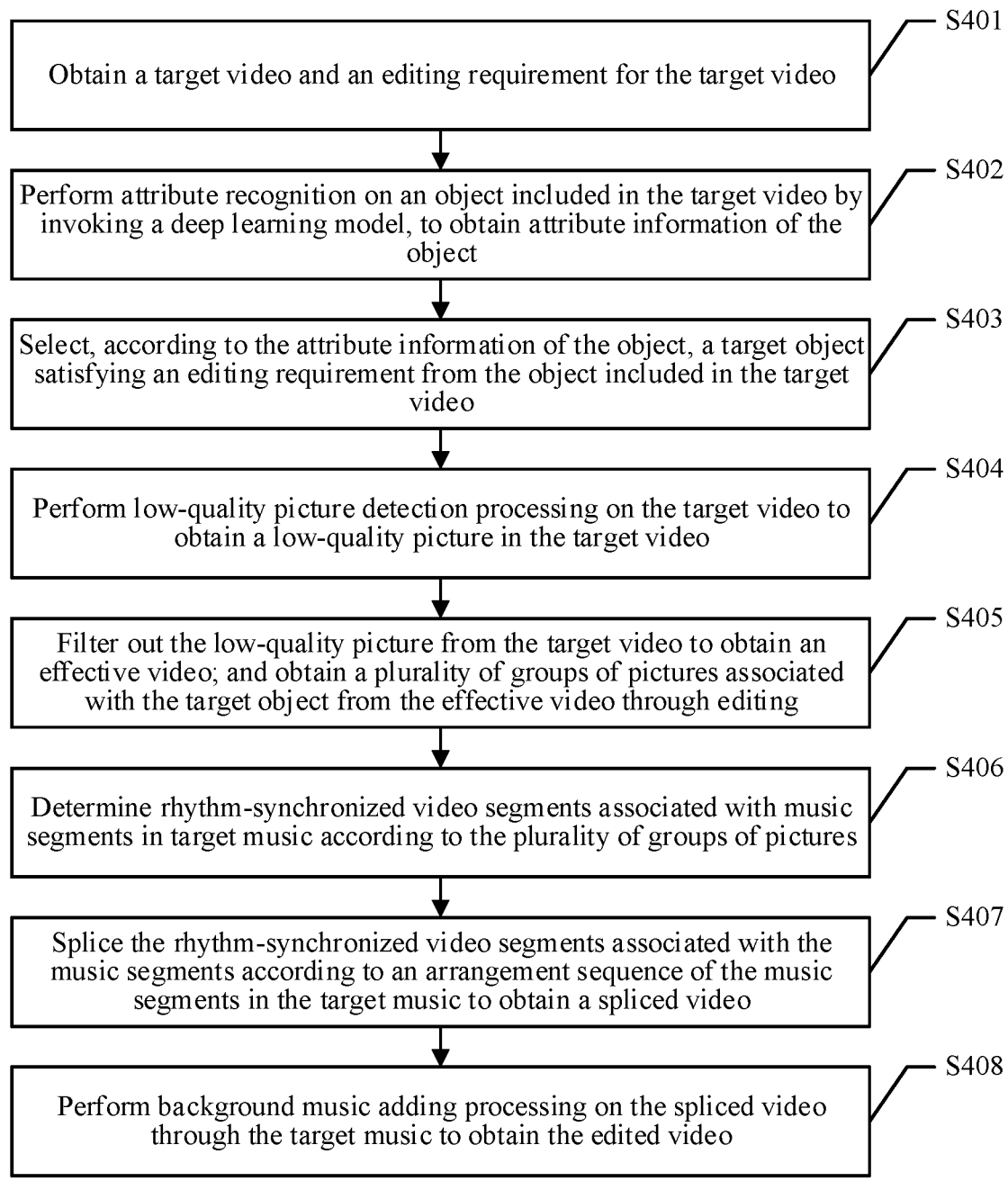
FIG. 4 is a schematic flowchart of an example video editing method according to another embodiment of this disclosure.

FIG. 4 is a schematic flowchart of another deep learning-based video editing method according to some embodiments of this disclosure, and the video editing method may be performed by the computer device mentioned above. Referring to FIG. 4, the video editing method may include the following steps S401 to S408:

S401. Obtain a target video and an editing requirement for the target video.

S402. Invoke a deep learning model to perform attribute recognition on an object included in the target video to obtain attribute information of the object, the deep learning model being a model having an attribute recognition capability and obtained by performing model training through a deep learning technology.

S403. Select, according to the attribute information of the object, a target object satisfying the editing requirement from the object included in the target video.

For example implementations of S401 to S403 mentioned in this embodiment of this disclosure, reference may be made to example implementations of S201 and S202 mentioned in the foregoing embodiments of this disclosure.

S404. Perform low-quality picture detection processing on the target video to obtain a low-quality picture in the target video.

The low-quality picture may include at least one of the following: a blurred picture determined according to a picture definition, a repeated picture, or a group picture including a plurality of objects simultaneously. For low-quality pictures of different types, low-quality picture detection processing may be performed by using different detection manners, so that during an implementation, the computer device may pre-determine pictures of types that may be included in the low-quality pictures according to an actual editing objective, so as to determine a detection manner to perform low-quality picture detection processing on the target video. For example, when the editing objective is used for indicating an intention of editing the target video into an edited video of a role collection type, or an edited video of an action consistency type, or an edited video of a role emotion orientation type, the low-quality picture may include one or more of a blurred picture, a repeated picture, and a group picture. When the editing objective is used for indicating an intention of editing the target video into an edited video of a CP collection type, the low-quality picture may include one or more of a blurred picture and a repeated picture.

The following describes three non-limiting examples of S404: how to detect a blurred picture, how to detect a repeated picture, and how to detect a group picture:

(I) The Low-Quality Picture Includes the Blurred Picture:

In some examples, one independent frame of picture may be used as a detection unit, a picture definition of each frame of picture in the target video is calculated respectively, and whether each frame of picture is a blurred picture is detected respectively according to the picture definition of each frame of picture. The picture definition of any picture may be represented by using a standard deviation (or variance) of a convolved picture obtained by performing convolution processing on the picture. Correspondingly, an implementation of S404 may include:

obtaining a dynamic definition threshold adapted to the target video, where the dynamic definition threshold is calculated according to picture definitions of some pictures in the target video; traversing each frame of picture in the target video, and performing convolution processing on a traversed current picture to obtain a convolved picture, where for example, convolution processing may be performed on the current traversed picture by using a Laplace operator to obtain the convolved picture; or convolution processing may be also performed on the current traversed picture by using a preset convolution kernel to obtain the convolved picture; and performing mean operation on each pixel value in the convolved picture, and calculating a picture definition of the current picture according to a mean obtained through the mean operation and a difference between each pixel value. For example, a standard deviation or a variance of the current picture is calculated according to the calculated mean and the difference between each pixel value, and a calculation result is used as the picture definition of the current picture. After the picture definition of the current picture is obtained, the picture definition of the current picture may be compared with the dynamic definition threshold, and when the picture definition of the current picture is less than the dynamic definition threshold, the current picture is determined as a blurred picture.

In some examples, when the target video is photographed by a plurality of cameras, a storyboard segment photographed by one camera may be also used as a detection unit, a segment definition of each storyboard segment is calculated respectively, whether each storyboard segment is blurred is detected respectively according to the segment definition of each storyboard segment, and each frame of picture in a blurred storyboard segment is used as a blurred picture. The segment definition of any storyboard segment may be calculated according to a picture definition of each frame of picture in the storyboard segment. Correspondingly, an implementation of S404 may include:

obtaining a dynamic definition threshold adapted to the target video; and splitting the target video into a plurality of storyboard segments, and traversing the plurality of storyboard segments, where each frame of picture in one storyboard segment is photographed by a same camera. A picture definition of each frame of picture in a traversed current storyboard segment may be calculated. A segment definition of the current storyboard segment may be then calculated according to the picture definition of each frame of picture in the current storyboard segment. For example, a mean of the picture definition of each frame of picture in the current storyboard segment may be calculated, and the calculated mean may be used as the segment definition of the current storyboard segment. Alternatively, weighted summation may be performed on the picture definition of each frame of picture in the current storyboard segment by using a weight of each frame of picture in the current storyboard segment, to obtain the segment definition of the current storyboard segment. A sum of the weight of each frame of picture in the current storyboard segment is equal to 1, and the weight of each frame of picture may be preset or may be determined according to an arrangement position of each frame of picture in the current storyboard segment, where a closer distance of the arrangement position to a middle position indicates a greater weight. After the segment definition of the current storyboard segment is obtained, the segment definition of the current storyboard segment may be compared with the dynamic definition threshold; and when the segment definition is less than the dynamic definition threshold, each frame of picture in the current storyboard segment is determined as a blurred picture.

In the foregoing two implementations, an implementation of the step of obtaining a dynamic definition threshold adapted to the target video may be: performing picture sampling processing on the target video to obtain K frames of sampled pictures, K being a positive integer; and calculating a picture definition of each frame of sampled picture in the K frames of sampled pictures respectively, and calculating the dynamic definition threshold adapted to the target video according to a threshold calculation strategy and the picture definition of each frame of sampled picture. The threshold calculation strategy may be used for instructing to use a mean of the picture definition of each frame of sampled picture as the dynamic definition threshold; or rearrange each frame of sampled picture in descending order of the picture definition, and use a picture definition of a $K^{th}$ sampled picture after rearrangement as the dynamic definition threshold. Herein, $k \in [1, K]$, and a value of k may be set according to a service requirement. For example, it is assumed that 100 frames of pictures are sampled in total, and the service requirement instructs to use a picture definition of a sampled picture corresponding to a latter 10% of the picture definition as the dynamic definition threshold, a picture definition of a $90^{th}$ sampled picture after rearrangement may be used as the dynamic definition threshold.

The foregoing is described by using the dynamic definition threshold as an example, and in other embodiments, a preset fixed definition threshold may be also obtained, and the blurred picture is detected by comparing the picture definition or the segment definition with the fixed definition threshold, for an example implementation, reference may be made to the example implementation of the dynamic definition threshold discussed above.

(II) The Low-Quality Picture Includes the Repeated Picture:

In some examples, when the attribute information of the object includes the facial information of the object and the facial information includes a plurality of facial features of the object and a facial time mark of each of the plurality of facial features, the facial time mark of each facial feature is used for indicating a picture to which the object belongs when a corresponding facial feature is recognized from the target video, and the computer device may detect, for any object, whether a repeated picture of the object exists in the target video by combining the facial time marks in the facial information of the object. Correspondingly, an implementation of S404 may include:

traversing the object included in the target video, and arranging various facial features in facial information of a traversed current object in ascending order of facial time marks; traversing the arranged facial features sequentially, and selecting a second facial feature from facial features that have not been selected and after a traversed first facial feature; and calculating a facial similarity between the first facial feature and the second facial feature and a playing time difference between a first picture and a second picture, where the first picture mentioned herein is a picture indicated by a facial time mark of the first facial feature, and the second picture is a picture indicated by a facial time mark of the second facial feature. Then, whether the first facial feature and the second facial feature are similar may be determined by comparing whether the facial similarity is greater than a first threshold, and whether the first picture and the second picture appear within close times may be determined by comparing whether the playing time difference is greater than a time difference threshold. When the facial similarity is greater than the first threshold and the playing time difference is less than the time difference threshold, the second picture may be determined as a repeated picture, and each frame of picture in a storyboard segment in which the second picture is located may be used as a repeated picture. When the facial similarity is not greater than the first threshold and/or the playing time difference is not less than the time difference threshold, it is determined that the second picture is not a repeated picture. In this case, a second facial feature may be reselected, and the step of calculating a facial similarity between the first facial feature and the second facial feature may be jumped to again until all the facial features in the facial information of the current object are traversed. It is to be understood that, after all the facial features in the facial information of the current object are traversed, a next object may be traversed continuously until each object in the target video is traversed.

In some examples, when the target video is photographed by a plurality of cameras, the computer device may also detect whether any two storyboard segments are repeated segments by comparing a segment similarity between the two storyboard segments, so as to detect whether pictures in the two storyboard segments are repeated pictures. Correspondingly, an implementation of S404 may include:

splitting the target video into a plurality of storyboard segments, where the plurality of storyboard segments are arranged according to an appearance sequence in the target video, and each frame of picture in one storyboard segment is photographed by a same camera; and traversing the plurality of storyboard segments, and selecting a reference storyboard segment from storyboard segments that have not been selected and after a traversed current storyboard segment. Then, a segment similarity between the current storyboard segment and the reference storyboard segment may be calculated, and for example, the segment similarity between the current storyboard segment and the reference storyboard segment may be calculated by using a cosine similarity formula shown by formula 1.1; or the segment similarity between the current storyboard segment and the reference storyboard segment may be calculated by using another similarity calculation formula (for example, a Pearson correlation formula or a Euclidean distance formula). After the segment similarity is obtained, whether the current storyboard segment and the reference storyboard segment are similar may be determined by comparing whether the segment similarity is greater than a second threshold. When the segment similarity is greater than the second threshold, it is considered that the current storyboard segment and the reference storyboard segment are similar. In this case, the reference storyboard segment may be considered as a repeated storyboard segment, and each frame of picture in the reference storyboard segment may be determined as a repeated picture; or otherwise, a reference storyboard segment is reselected, and the step of calculating the segment similarity between the current storyboard segment and the reference storyboard segment is jumped to again until no reference storyboard segment of the current storyboard segment can be selected. It is to be understood that, after determining that no reference storyboard segment of the current storyboard segment can be selected again, a next storyboard segment may be continuously traversed until each storyboard segment in the target video is traversed.

$$S = \cos(\theta) = \frac{A \cdot B}{\|A\|\|B\|} = \frac{\sum_{i=1}^{n} A_i \times B_i}{\sqrt{\sum_{i=1}^{n}(A_i)^2} \times \sqrt{\sum_{i=1}^{n}(B_i)^2}} \quad \text{Formula 1.1}$$

S represents the segment similarity between the current storyboard segment and the reference storyboard segment; A represents the current storyboard segment and $A_i$ represents an $i^{th}$ frame of picture in the current storyboard segment; B represents the reference storyboard segment and $B_i$ represents an $i^{th}$ frame of picture in the reference storyboard segment; and n represents a number of pictures included in the current storyboard segment or the reference storyboard segment.

(II) The Low-Quality Picture Includes the Group Picture:

As can be known from the above, the attribute information of the object may include the facial information of the object and the facial information includes a plurality of facial features of the object and a facial time mark of each of the plurality of facial features, and the facial time mark of each facial feature is used for indicating a picture to which the object belongs when a corresponding facial feature is recognized from the target video. Therefore, the computer device may calculate a number of facial time marks corresponding to each frame of picture in the target video according to the facial time marks in the facial information of the object, to determine a number of objects (number of person_id) corresponding to each frame of picture. When the number of objects (number of person_id) corresponding to any picture is greater than a number threshold (for example, 2 or 3), the picture may be determined as a group picture. Optionally, each frame of picture in a storyboard segment in which the picture is located may be considered as a group picture.

S405. Filter out the low-quality picture from the target video to obtain an effective video; and obtain the plurality of groups of pictures associated with the target object from the effective video through editing, where each group of picture includes one frame of picture or includes one video sub-segment.

In some examples, when the computer device edits the effective video by using the picture editing manner, each group of picture obtained through editing includes one frame of picture. An implementation of obtaining the plurality of groups of pictures associated with the target object from the effective video through editing may be: determining a plurality of frames of pictures associated with the target object from the effective video according to the attribute information of the target object, and obtaining the determined plurality of frames of pictures from the effective video through editing respectively. A picture associated with the target object may include any one of the following: (1) A frame of picture including the target object; (2) A frame of picture including the target object having a common emotion state or a preset emotion state, a group of picture including a third object having the common emotion state, or a frame of picture including a fourth object having the preset emotion state; and (3) A frame of picture including a CP to which the target object belongs.

In some examples, when the computer device edits the effective video by using the segment editing manner, each group of picture obtained through editing includes one video sub-segment. An example implementation of obtaining the plurality of groups of pictures associated with the target object from the effective video through editing may be: obtaining target music, and performing rhythm detection on the target music to obtain rhythm point locations in the target music; splitting the target music into M music segments according to the rhythm point locations of the target music, where a playing starting point or a playing ending point of each music segment is a rhythm point location, and M is a positive integer; and traversing the M music segments, and obtaining a video sub-segment associated with the target object from the effective video through editing according to a playing duration of a traversed current music segment, where a duration of the video sub-segmented obtained through editing is equal to the playing duration of the current music segment. The plurality of groups of pictures associated with the target object may be obtained after the M music segments in the target music are all traversed.

A group of picture associated with the target object may include any one of the following: (1) A video sub-segment including the target object; (2) A video sub-segment corresponding to a picture sub-sequence including the target object performing a common action or a preset action, a video sub-segment corresponding to a picture sub-sequence including a first object performing the common action, or a video sub-segment corresponding to a picture sub-sequence including a second object performing the preset action; (3) A video sub-segment including the target object having a common emotion state or a preset emotion state, a video sub-segment including a third object having the common emotion state, or a video sub-segment including a fourth object having the preset emotion state; and (4) A video sub-segment of a frame of picture including a CP to which the target object belongs.

In addition, in a case of obtaining the target music, the computer device may select music from a music library as the target music; or determine the target music in combination with the editing objective and the editing manner (namely, the picture editing manner of the segment editing manner). For example, a first case: the editing objective is used for instructing to edit the target video into an edited video of a CP collection type. In this case, no matter the editing manner is the picture editing manner or the segment editing manner, the target music may be selected from a plurality of music in an oriented music style (for example, a lyric and happy music style). A second case: the editing objective is used for instructing to edit the target video into an edited video of a role collection type, or instructing to edit the target video into an edited video of a role emotion orientation type, or instructing to edit the target video into an edited video of an action consistency type. In this case, when the editing manner is the picture editing manner, namely, each group of picture includes one frame of picture, since the flexibility of each frame of picture is relatively high, music in any music style or music corresponding to any music emotion may be applied. Therefore, music may be selected as the target music, or the target music may be selected from a plurality of music corresponding to an oriented target emotion. When the editing manner is the segment editing manner, namely, each group of picture includes one video sub-segment, a video emotion of each storyboard segment may be calculated, and a music style corresponding to a video emotion having the largest number may be selected as a target music style; and the target music is selected from a plurality music in the target music style.

An implementation of calculating a video emotion of any storyboard segment may be: recognizing and determining an initial emotion of the storyboard segment based on an emotion feature of each object in the storyboard segment; performing emotion recognition on text information (for example, dialog text) in each frame of picture in the storyboard segment to obtain a reference emotion; and finally determining the video emotion of the storyboard segment according to the reference emotion and the initial emotion. In an implementation, an emotion similarity between the reference emotion and the initial emotion may be calculated, and when the emotion similarity is greater than a preset threshold, the reference emotion or the initial emotion may be directly used as the video emotion of the storyboard segment. In another implementation, an emotion score table may be preset, and the emotion score table may include a plurality of emotions and a score corresponding to each of the plurality of emotions. The computer device may query a first score corresponding to the initial emotion and a second score corresponding to the reference emotion in the emotion score table, and then perform weighted summation on the first score and the second score according to a weight value corresponding to the initial emotion and a weight value corresponding to the reference emotion to obtain a weight value. Finally, an emotion corresponding to the weight value may be queried in the emotion score table, and the queried emotion is used as the video emotion of the storyboard segment.

An implementation of selecting the target music from the plurality of music in the target music style may be: determining a target emotion according to the video emotion of each video sub-segment (namely, each group of picture); recognizing a music emotion of each music in the target music style, and using music corresponding to a music emotion same as the target emotion as the target music. It is to be understood that, the manner for recognizing a video emotion of any video sub-segment is similar to the manner for recognizing a video emotion of any storyboard segment. An example implementation of recognizing a music emotion of any music may be: converting any music into a spectrogram, and performing audio emotion classification on the spectrogram by using a convolutional recurrent neural network (CRNN) model to obtain the music emotion of the music.

S406. Determine rhythm-synchronized video segments associated with music segments in the target music according to the plurality of groups of pictures.

As can be known from the above, the target music includes M music segments, a playing starting point or a playing ending point of each music segment is a rhythm point location, and M is a positive integer. In addition, a music rhythm-synchronized video is a video that picture switching or video segment switching is exactly performed at the rhythm point location of the music, a playing duration of any rhythm-synchronized video segment used for generating a music rhythm-synchronized video is equal to a playing duration of an associated music segment. Each group of picture in the plurality of groups of pictures may include one video sub-segment or may include one frame of picture. Therefore, as the plurality of groups of pictures differs, the implementation of S406 also differs, which are described in detail below.

Figure 5A:
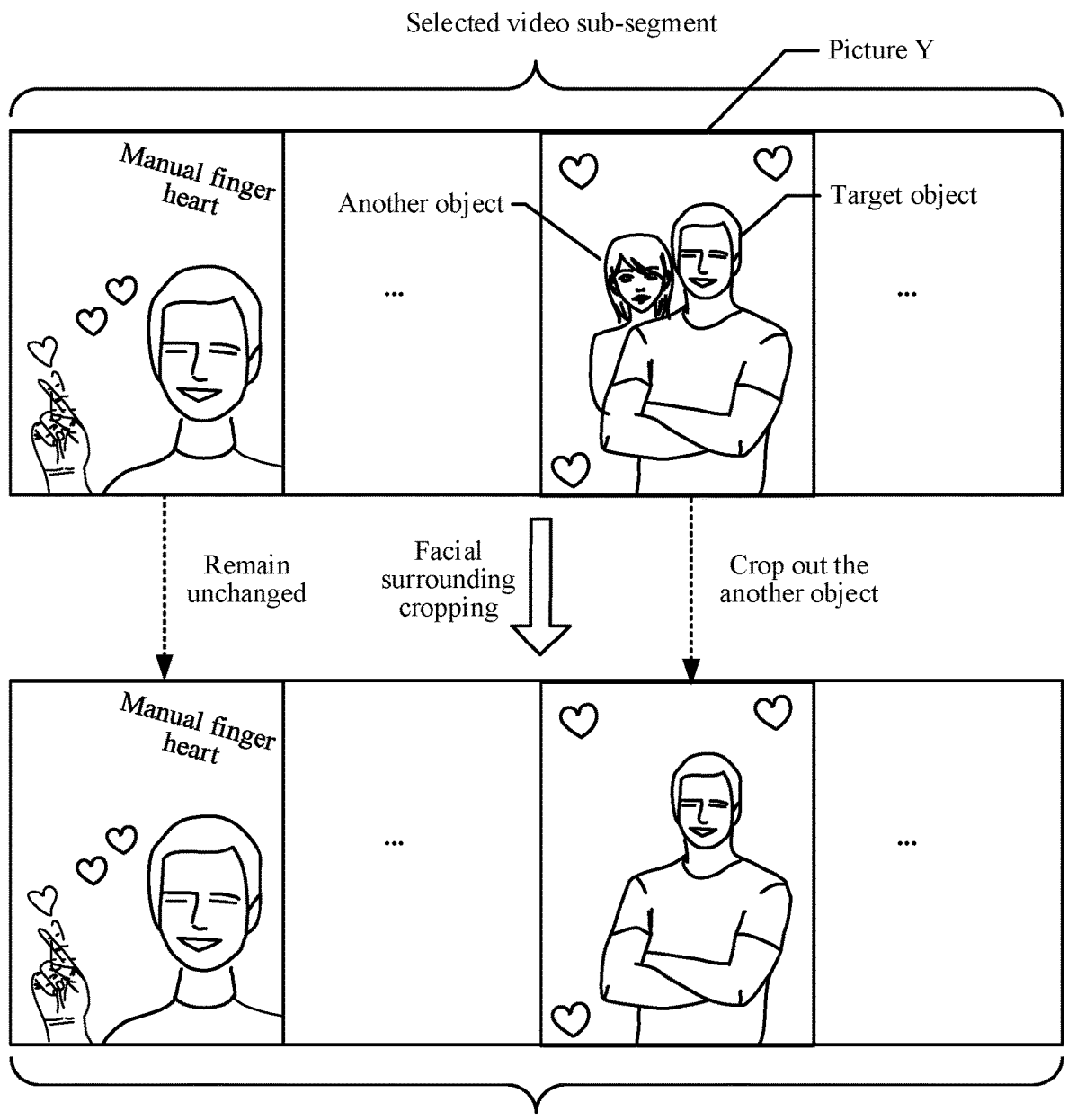
FIG. 5a is a schematic diagram of an example method for determining a rhythm-synchronized video segment according to an embodiment of this disclosure.

In some examples, when each group of picture includes one video sub-segment, the implementation of S406 may be: according to a playing duration of each group of picture (each video sub-segment), selecting a video sub-segment whose playing duration is equal to a playing duration of an $m^{th}$ music segment from the plurality of groups of pictures (the plurality of video sub-segments) as a rhythm-synchronized video segment associated with the $m^{th}$ music segment, where $m \in [1, M]$. Optionally, when the editing objective is used for indicating an intention of editing the target video into an edited video of a role collection type, to improve a watching feeling of a subsequent edited video, after the video sub-segment whose playing duration is equal to the playing duration of the $m^{th}$ music segment is selected from the plurality of groups of pictures according to the playing duration of each group of picture, facial surrounding cropping is performed on each frame of picture in the selected video sub-segment, to crop out other content affecting facial presentation of the target object. The cropped video sub-segment is then used as the rhythm-synchronized video segment associated with the $m^{th}$ music segment. For example, as shown in FIG. 5a, it is assumed that the selected video sub-segment includes one frame of picture Y which includes the target object and another object and the another object is relatively close to a face of the target object, the another object may be cropped out by performing facial surrounding cropping in the picture Y, and other frames of pictures in the video sub-segment remain unchanged, so as to obtain the rhythm-synchronized video segment associated with the $m^{th}$ music segment.

Figure 5B:
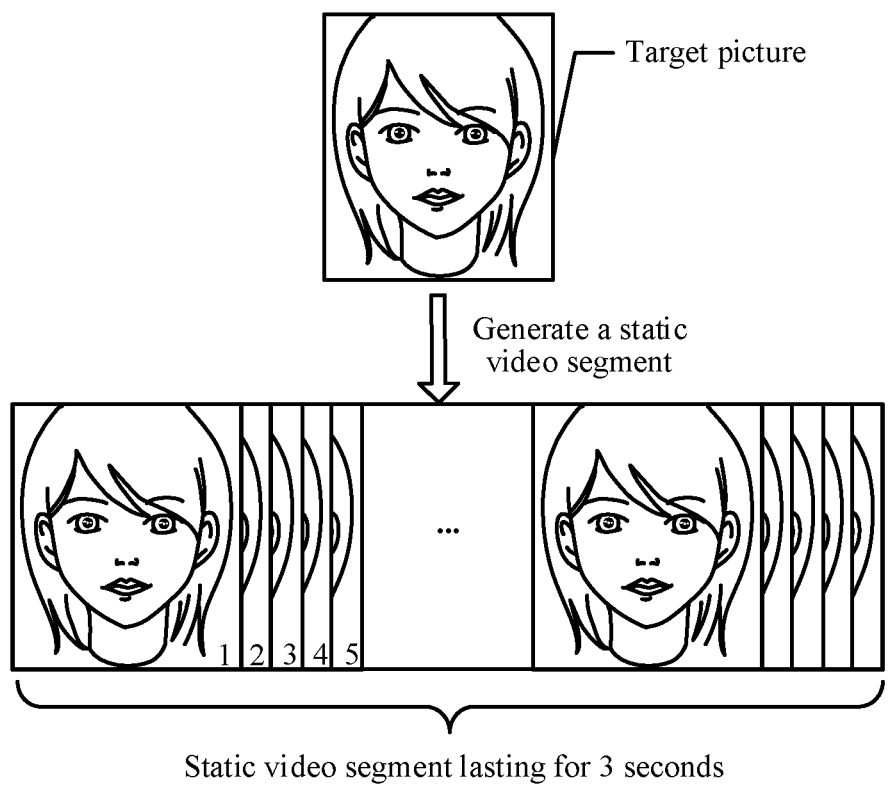
FIG. 5b is a schematic diagram of an example method for generating a static video segment according to an embodiment of this disclosure.

In some examples, when each group of picture includes one frame of picture, the implementation of S406 may be: selecting a target picture matching the $m^{th}$ music segment from the plurality of groups of pictures (the plurality of frames of pictures), generating a static video segment through the target picture, and using the static video segment as the rhythm-synchronized video segment associated with the $m^{th}$ music segment. Each frame of picture in the static video segment is the target picture, and a playing duration of the static video segment is equal to the playing duration of the $m^{th}$ music segment. For example, it is assumed that the target picture is shown in an upper figure in FIG. 5b and the playing duration of the $m^{th}$ music segment is 3 seconds, a schematic diagram of a static video segment lasting for 3 seconds generated by using the target picture may be shown in a lower figure in FIG. 5b. When the editing objective is used for indicating an intention of editing the target video into an edited video of a role collection type, after the target picture is selected, the computer device may also perform facial surrounding cropping on the target picture to crop out other content affecting the facial presentation of the target object. The cropped target picture is then used to generate a static video segment.

Figure 5C:
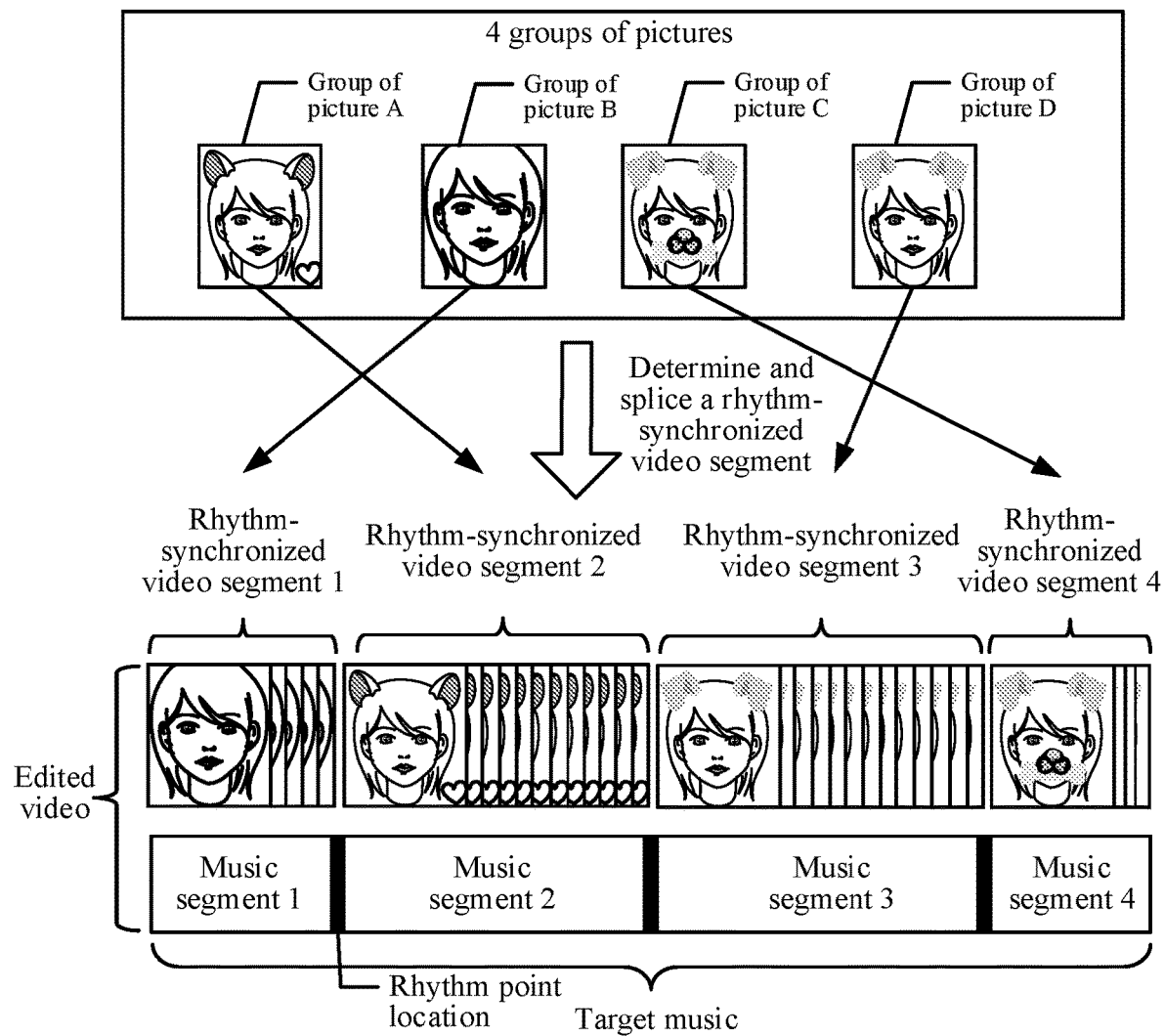
FIG. 5c is a schematic diagram of an example method for generating an edited video according to an embodiment of this disclosure.

The number of groups of pictures obtained from the target video through editing and the number of music segments in the target music may be the same or may be different. When the number of groups of pictures obtained from the target video through editing is greater than or equal to the number of music segments, the computer device may select different groups of pictures when generating a rhythm-synchronized video segment according to the playing duration of each music segment, so that the generated rhythm-synchronized video segments may be different from each other. An example in which each group of picture includes one frame of picture (namely, each rhythm-synchronized video segment is a static video segment) is used, a schematic diagram of an edited video generated subsequently by using each rhythm-synchronized video segment through S407 and S408 may be shown in FIG. 5c. In FIG. 5c, 4 groups of pictures and 4 music segments are included. The 4 groups of pictures are respectively a group of picture A, a group of picture B, a group of picture C, and a group of picture D, each group of picture includes one frame of picture, and a corresponding rhythm-synchronized video segment is generated for each group of picture, where the group of picture A corresponds to a rhythm-synchronized video segment 2, the group of picture B corresponds to a rhythm-synchronized video segment 1, the group of picture C corresponds to a rhythm-synchronized video segment 4, and the group of picture D corresponds to a rhythm-synchronized video segment 3. The 4 music segments are respectively a music segment 1, a music segment 2, a music segment 3, and a music segment 4, and an edited video shown in FIG. 5c is generated by using the rhythm-synchronized video segments 1 to 4 and the music segments 1 to 4 through S407 and S408.

Figure 5D:
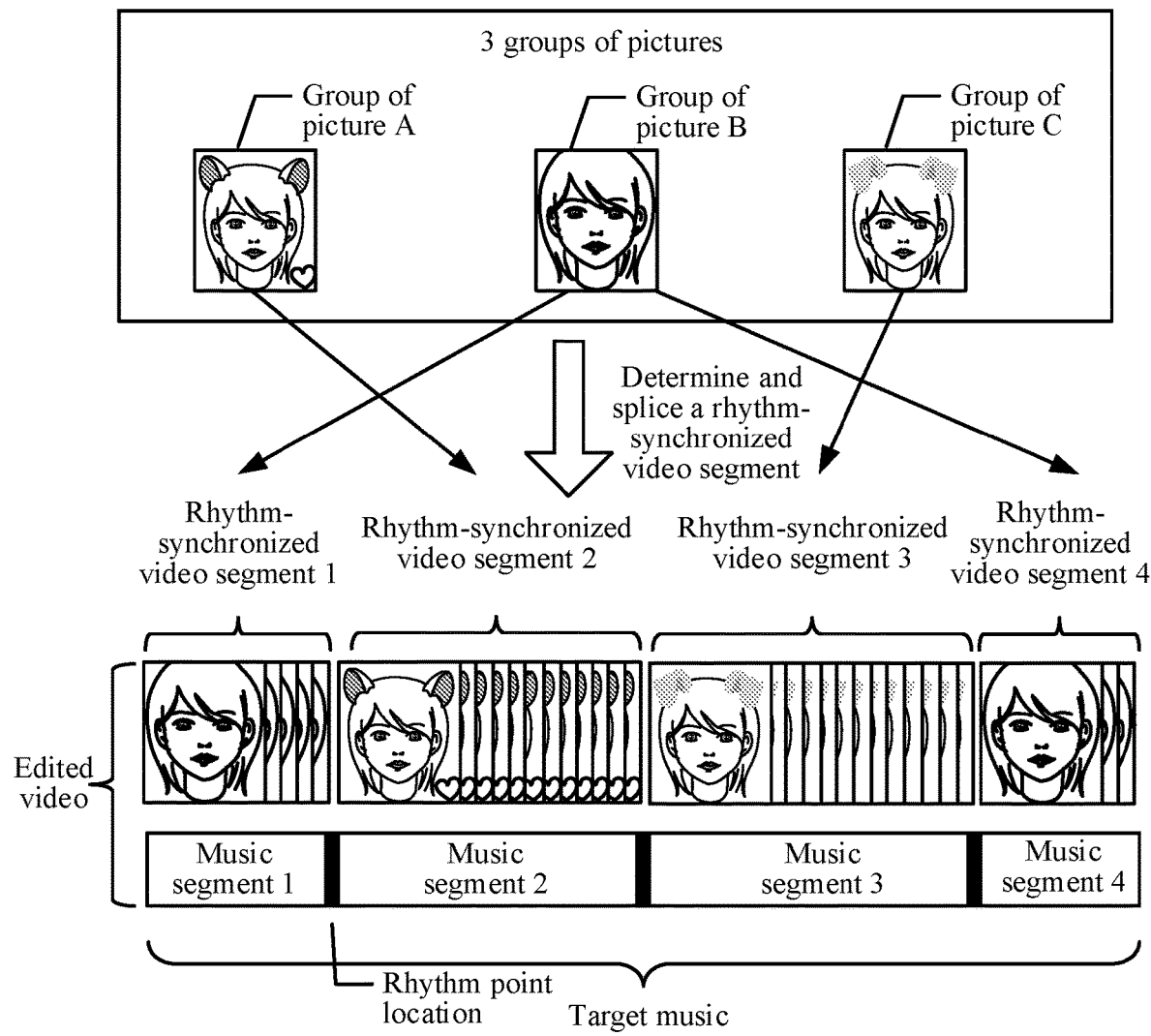
FIG. 5d is a schematic diagram of an example method for generating an edited video according to an embodiment of this disclosure.

In another case that the number of groups of pictures obtained from the target video through editing is less than the number of music segments, the computer device may repeatedly select one or more groups of pictures when generating a rhythm-synchronized video segment according to the playing duration of each music segment, so that the generated rhythm-synchronized video segments include one or more repeated rhythm-synchronized video segments. In this case, a schematic diagram of an edited video generated subsequently by using each rhythm-synchronized video segment through S407 and S408 may be shown in FIG. 5d. In FIG. 5d, 3 groups of pictures and 4 music segments are included. The 3 groups of pictures are respectively a group of picture A, a group of picture B, and a group of picture C, each group of picture includes one frame of picture, and a corresponding rhythm-synchronized video segment is generated for each group of picture. Because the number of groups of pictures is less than the number of music segments, the group of picture B is selected to generated a repeated rhythm-synchronized video segment. Rhythm-synchronized video segments that are finally obtained are a rhythm-synchronized video segment 2 corresponding to the group of picture A, a rhythm-synchronized video segment 1 and a rhythm-synchronized video segment 4 corresponding to the group of picture B, and a rhythm-synchronized video segment 3 corresponding to the group of picture C. The 4 music segments are respectively a music segment 1, a music segment 2, a music segment 3, and a music segment 4, and an edited video shown in FIG. 5d is generated by using the rhythm-synchronized video segments 1 to 4 and the music segments 1 to 4 through S407 and S408.

S407. Splice the rhythm-synchronized video segments associated with the music segments according to an arrangement sequence of the music segments in the target music to obtain a spliced video.

S408. Perform background music adding processing on the spliced video through the target music to obtain the edited video.

In S407 and S408, the playing duration of each rhythm-synchronized video segment is equal to a playing duration of an associated music segment, so that by performing splicing processing and background music adding processing on the rhythm-synchronized video segments according to the arrangement sequence of the music segments, an edited video with accurate rhythm-synchronization may be obtained. Therefore, during playing of the edited video, segment switching can be performed at each rhythm point location of the target music relatively accurately.

In the embodiments of this disclosure, the deep learning technology may be used to intelligently select a plurality of groups of pictures satisfying an editing requirement and an editing objective from a target video. In addition, in a process of obtaining the plurality of groups of pictures through editing and generating an edited video by using the plurality of groups of pictures, rhythm-synchronized background music adding processing may be intelligently performed by using target music, so that a wonderful edited video having suitable background music can be automatically obtained through editing, thereby improving the variety of edited video production. In an entire video editing process, no user needs to participate in the process, so that time costs and labor costs may be effectively saved, thereby effectively improving the video editing efficiency.

Figure 6:
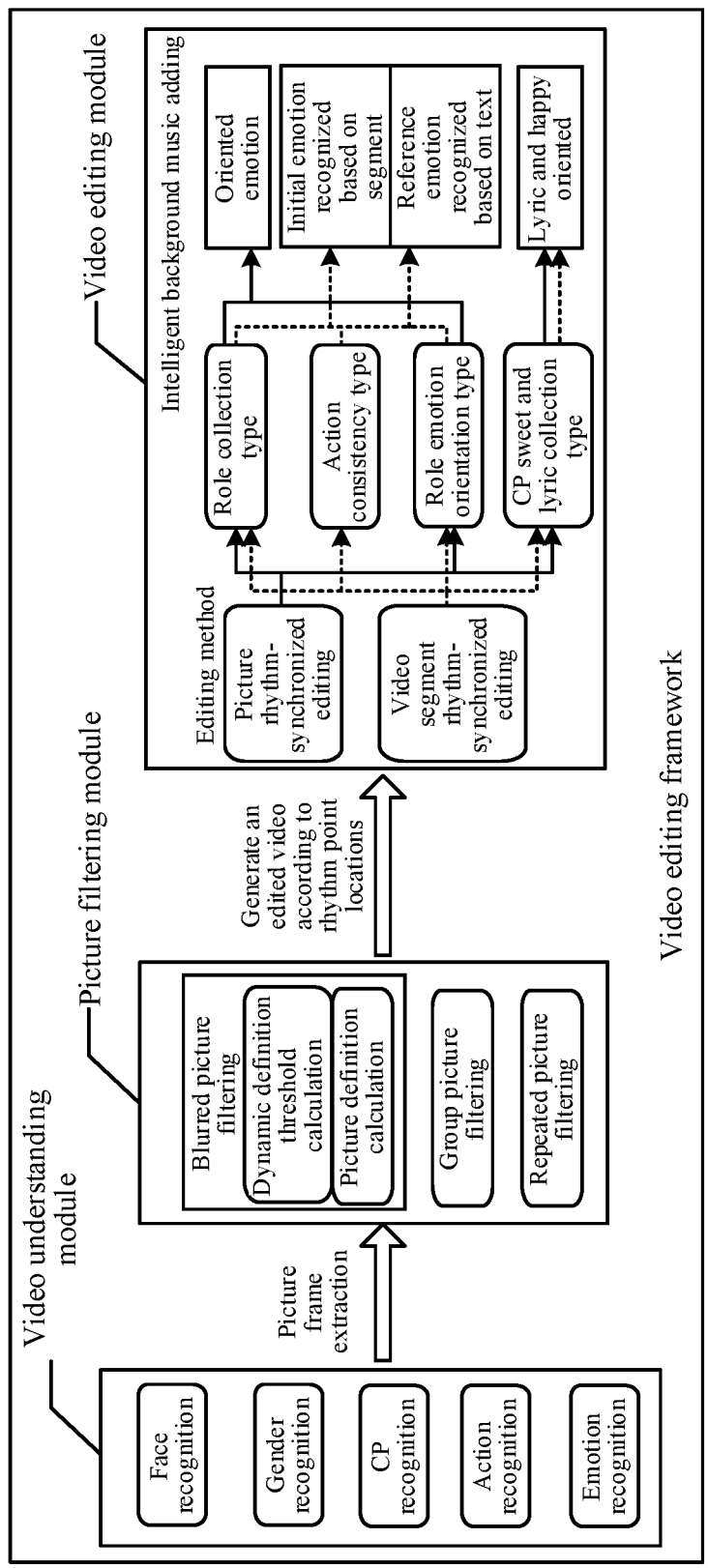
FIG. 6 is a schematic structural diagram of an example video editing framework according to an embodiment of this disclosure.

Based on the description of the embodiments of the video editing method shown in FIG. 2 and FIG. 4, some embodiments of this disclosure may provide a video editing framework, so that the video editing framework may be directly invoked to perform video editing processing on a target video when the user has a video editing requirement. As shown in FIG. 6, the video editing framework may include a video understanding module, a picture filtering module, and a video editing module. The following describes working principles of the three modules respectively:

(I) Video understanding module: the video understanding module is mainly configured to perform one-dimensional or multi-dimensional attribute recognition on the target video, such as gender recognition, CP recognition, action recognition, emotion recognition, and facial recognition, to obtain attribute information of an object included in the target video.

(II) Picture filtering module: the picture filtering module is mainly configured to perform low-quality picture filtering processing on the target video to obtain an effective video. The picture filtering module may be configured to perform random sampling (or referred to as picture frame extraction) on the target video to obtain K sampled pictures, and dynamically calculate a dynamic definition threshold according to picture definitions of the K sampled pictures. A blurred picture in the target video may be then filtered based on the dynamic definition threshold. In addition, the picture filtering module may be further configured to perform filtering processing on a group picture and/or filtering processing on a repeated picture.

(III) Video editing module: the video editing module is mainly configured to obtain a plurality of groups of pictures from the effective video outputted by the picture filtering module through editing by using one or more editing manners, and perform operations such as splicing and intelligent background music adding processing on the plurality of groups of pictures to obtain an edited video. The editing manner mentioned herein may be approximately divided into two types: a picture rhythm-synchronized editing method and a video segment rhythm-synchronized editing method. The picture rhythm-synchronized editing method refers to a method of obtaining a plurality of frames of pictures associated with the target object from the effective video through editing and generating an edited video by using the plurality of frames of pictures; and the video rhythm-synchronized editing method refers to a method of obtaining a plurality of video sub-segments associated with the target object from the effective video through editing and generating an edited video by using the plurality of video sub-segments.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

An editing method of each type may be used for generating edited videos of one or a plurality of types. For example, the picture rhythm-synchronized editing method may be used for generating an edited video of a role collection type, an edited video of a CP sweet and lyric collection type, and an edited video of a role emotion orientation type. In another example, the video segment rhythm-synchronized editing method may be used for generating an edited video of a role collection type, an edited video of a CP sweet and lyric collection type, an edited video of an action consistency type, and an edited video of a role emotion orientation type. The edited video of a CP sweet and lyric collection type refers to a collection video formed by determining an occurrence time of a hot CP in the target video through CP recognition, extracting pictures or video sub-segments of a sweet or lyric style from the effective video through ffmpeg, and splicing the extracted pictures or video sub-segments. Further, an edited video of any type generated according to any editing method may be a music rhythm-synchronized video obtained through intelligent background music adding processing, or may be a common edited video obtained without intelligent background music adding processing.

In an actual application, the user may transmit a video editing request to trigger the video editing framework to invoke the foregoing modules to perform recognition and editing on the target video, to produce wonderful edited videos of a plurality of types such as video segment rhythm-synchronized, picture rhythm-synchronized, lover sweet collection, and action consistency collection, so as to support batch releasing and film industry propagation goals of short videos on an advertisement side. The video editing framework may produce wonderful video collections of different types in batches based on an algorithm without manual intervention, which is applicable to scenarios such as advertisement releasing and episode propagation, thereby greatly shortening a link duration of content production-propagation, and assisting in propagation and hot degree improvement of new episodes. In addition, wonderful videos including features such as a large number of different characters, emotions, and actions may be further produced, so that new ideas and feedback may be provided to manual editing while the content production variety of a platform is greatly enriched.

Figure 7:
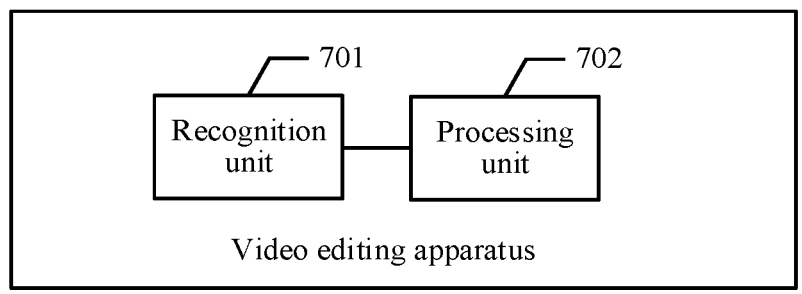
FIG. 7 is a schematic structural diagram of an example video editing apparatus according to an embodiment of this disclosure.

Based on the description of related embodiments of the video editing method, some embodiments of this disclosure further provide a deep learning-based video editing apparatus, and the video editing apparatus may be a computer program (including program code) run in a computer device. The video editing apparatus may perform the video editing method shown in FIG. 2 or FIG. 4. Referring to FIG. 7, the video editing apparatus may operate the following units:

a recognition unit 701, configured to invoke a deep learning model to perform attribute recognition on an object included in a target video to obtain attribute information of the object, the deep learning model being a model having an attribute recognition capability and obtained by performing model training through a deep learning technology;

a processing unit 702, configured to select, according to the attribute information of the object, a target object satisfying an editing requirement from the object included in the target video; and the processing unit 702 being further configured to obtain a plurality of groups of pictures associated with the target object from the target video through editing, and generate an edited video corresponding to the target video by using the plurality of groups of pictures.

In an implementation, the apparatus further includes an obtaining unit; and the obtaining unit is configured to obtain a target video and an editing requirement for the target video.

In an implementation, when configured to obtain a plurality of groups of pictures associated with the target object from the target video through editing, the processing unit 702 may be configured to:

perform low-quality picture detection processing on the target video to obtain a low-quality picture in the target video;

filter out the low-quality picture from the target video to obtain an effective video; and obtain the plurality of groups of pictures associated with the target object from the effective video through editing.

In still another implementation, the low-quality picture includes at least one of the following: a blurred picture determined according to a picture definition, a repeated picture, or a group picture including a plurality of objects simultaneously.

In still another implementation, the low-quality picture includes the blurred picture; and correspondingly, when configured to perform low-quality picture detection processing on the target video to obtain a low-quality picture in the target video, the processing unit 702 may be configured to:

obtain a dynamic definition threshold adapted to the target video;

traverse each frame of picture in the target video, and perform convolution processing on a traversed current picture to obtain a convolved picture;

perform mean operation on each pixel value in the convolved picture, and calculate a picture definition of the current picture according to a mean obtained through the mean operation and a difference between each pixel value; and determine the current picture as the blurred picture when the picture definition of the current picture is less than the dynamic definition threshold.

In still another implementation, the target video is obtained through photographing by a plurality of cameras, and the low-quality picture includes the blurred picture; and correspondingly, when configured to perform low-quality picture detection processing on the target video to obtain a low-quality picture in the target video, the processing unit 702 may be configured to:

obtain a dynamic definition threshold adapted to the target video;

split the target video into a plurality of storyboard segments, and traverse the plurality of storyboard segments, where each frame of picture in one storyboard segment is photographed by a same camera;

calculate a picture definition of each frame of picture in a traversed current storyboard segment, and calculate a segment definition of the current storyboard segment according to the picture definition of each frame of picture in the current storyboard segment; and determine each frame of picture in the current storyboard segment as the blurred picture when the segment definition is less than the dynamic definition threshold.

In still another implementation, when configured to obtain a dynamic definition threshold adapted to the target video, the processing unit 702 may be configured to:

perform picture sampling processing on the target video to obtain K frames of sampled pictures, K being a positive integer; and calculate a picture definition of each frame of sampled picture in the K frames of sampled pictures respectively, and calculate the dynamic definition threshold adapted to the target video according to a threshold calculation strategy and the picture definition of each frame of sampled picture, where the threshold calculation strategy is used for instructing to rearrange each frame of sampled picture in descending order of the picture definition, and using a picture definition of a $K^{th}$ sampled picture after rearrangement as the dynamic definition threshold, and $k \in [1, K]$; or using a mean of the picture definition of each frame of sampled picture as the dynamic definition threshold.

In still another implementation, the attribute information of the object includes facial information of the object, and the facial information includes a plurality of facial features of the object and a facial time mark of each of the plurality of facial features, where the facial time mark is used for indicating a picture to which the object belongs when a corresponding facial feature is recognized from the target video; and the low-quality picture includes the repeated picture, and when configured to perform low-quality picture detection processing on the target video to obtain a low-quality picture in the target video, the processing unit 702 may be configured to:

traverse the object, and arranging various facial features in facial information of a traversed current object in ascending order of facial time marks;

traverse the arranged facial features sequentially, and select a second facial feature from facial features that have not been selected and after a traversed first facial feature;

calculate a facial similarity between the first facial feature and the second facial feature and a playing time difference between a first picture and a second picture, where the first picture is a picture indicated by a facial time mark of the first facial feature, and the second picture is a picture indicated by a facial time mark of the second facial feature; and determine the second picture as the repeated picture when the facial similarity is greater than a first threshold and the playing time difference is less than a time difference threshold; or otherwise, reselect a second facial feature.

In still another implementation, the target video is obtained through photographing by a plurality of cameras, and the low-quality picture includes the repeated picture;

and correspondingly, when configured to perform low-quality picture detection processing on the target video to obtain a low-quality picture in the target video, the processing unit 702 may be configured to:

split the target video into a plurality of storyboard segments, where the plurality of storyboard segments are arranged according to an appearance sequence in the target video, and each frame of picture in one storyboard segment is photographed by a same camera;

traverse the plurality of storyboard segments, and select a reference storyboard segment from storyboard segments that have not been selected and after a traversed current storyboard segment;

calculate a segment similarity between the current storyboard segment and the reference storyboard segment; and determine each frame of picture in the reference storyboard segment as the repeated picture when the segment similarity is greater than a second threshold; or otherwise, reselect a reference storyboard segment.

In still another implementation, each group of picture in the plurality of groups of pictures includes one video sub-segment; and correspondingly, when configured to obtain the plurality of groups of pictures associated with the target object from the effective video through editing, the processing unit 702 may be configured to:

obtain target music, and perform rhythm detection on the target music to obtain rhythm point locations in the target music;

split the target music into M music segments according to the rhythm point locations of the target music, where a playing starting point or a playing ending point of each music segment is a rhythm point location, and M is a positive integer; and traverse the M music segments, and obtain a video sub-segment associated with the target object from the effective video through editing according to a playing duration of a traversed current music segment.

In still another implementation, when configured to generate an edited video corresponding to the target video by using the plurality of groups of pictures, the processing unit 702 may be configured to:

determine rhythm-synchronized video segments associated with music segments in the target music according to the plurality of groups of pictures, where a playing duration of any rhythm-synchronized video segment is equal to a playing duration of an associated music segment; and the target music includes M music segments, a playing starting point or a playing ending point of each music segment is a rhythm point location, and M is a positive integer;

splice the rhythm-synchronized video segments associated with the music segments according to an arrangement sequence of the music segments in the target music to obtain a spliced video; and perform background music adding processing on the spliced video through the target music to obtain the edited video.

In still another implementation, when configured to determine rhythm-synchronized video segments associated with music segments in the target music according to the plurality of groups of pictures, the processing unit 702 may be configured to:

select, when each group of picture in the plurality of groups of pictures includes one video sub-segment and according to a playing duration of each group of picture, a video sub-segment whose playing duration is equal to a playing duration of an $m^{th}$ music segment from the plurality of groups of pictures as a rhythm-synchronized video segment associated with the $m^{th}$ music segment, where $m \in [1, M]$; and select, when each group of picture in the plurality of groups of pictures includes one frame of picture, a target picture matching the $m^{th}$ music segment from the plurality of groups of pictures, generate a static video segment through the target picture, and use the static video segment as the rhythm-synchronized video segment associated with the $m^{th}$ music segment, where each frame of picture in the static video segment is the target picture, and a playing duration of the static video segment is equal to the playing duration of the $m^{th}$ music segment.

In still another implementation, the attribute information of the object includes at least one of the following: facial information, action information, or emotion information; the target video includes a plurality of objects; and correspondingly, when configured to select, according to the attribute information of the object, a target object satisfying an editing requirement from the object included in the target video, the processing unit 702 may be configured to:

calculate an object frequency of each of the plurality of objects appearing in the target video according to the facial information of the object respectively when the editing requirement instructs to select an object whose object frequency is higher than a frequency threshold or select an object having a highest object frequency; select an object whose object frequency is higher than the frequency threshold from the plurality of objects as a target object; or select an object having a highest object frequency from the plurality of objects as the target object;

select a first object group from the plurality of objects according to the action information of the object when the editing requirement instructs to select objects performing a common action or select objects performing a preset action, and use objects in the first object group as the target object, where the objects in the first object group perform the common action; or select an object performing the preset action according to the action information of the object from the plurality of objects as the target object; and select a second object group from the plurality of objects according to the emotion information of the object when the editing requirement instructs to select objects having a common emotion state or select objects having a preset emotion state, and use objects in the second object group as the target object, where the objects in the second object group have the common emotion state; or select an object having the preset emotion state according to the emotion information of the object from the plurality of objects as the target object.

In still another implementation, when the target object is selected according to the facial information, each group of picture in the plurality of groups of pictures includes the target object;

when the target object is selected according to the action information, the plurality of groups of pictures include a group of picture including the target object performing the common action or the preset action; and when the target object is selected according to the emotion information, the plurality of groups of pictures include a group of picture including the target object having the common emotion state or the preset emotion state.

In still another implementation, the deep learning model includes a first model and a second model;

the facial information and the emotion information are obtained through recognition by the first model, and the first model is a network model constructed and trained based on a deep convolutional neural network and configured to perform attribute recognition on each frame of picture in the target video; and the action information is obtained through recognition by the second model, and the second model is a slow-fast-combined network model constructed and trained based on a target slow and fast detection algorithm and configured to perform action recognition on each picture sub-sequence in the target video.

According to some embodiments of this disclosure, the steps in the method shown in FIG. 2 or FIG. 4 may be performed by the units of the video editing apparatus shown in FIG. 7. For example, the steps S201 and S202 shown in FIG. 2 may be performed by the recognition unit 701 and the processing unit 702 shown in FIG. 7, and the steps S203 and S204 may be performed by the processing unit 702 shown in FIG. 7. In another example, the steps S401 and S402 shown in FIG. 4 may be performed by the obtaining unit and the recognition unit 701 shown in FIG. 7, and the steps S403 to S408 may be performed by the processing unit 702 shown in FIG. 7.

According to another embodiment of this disclosure, units in the video editing apparatus shown in FIG. 7 may be separately or wholly combined into one or several other units, or one (or more) of the units herein may further be divided into multiple units of smaller functions. In this way, same operations can be implemented, and implementation of the technical effects of the embodiments of this disclosure is not affected. The foregoing units are divided based on logical functions. During actual application, a function of one unit may be implemented by a plurality of units, or functions of a plurality of units are implemented by one unit. In other embodiments of this disclosure, the video editing apparatus may also include other units. During actual application, the functions may also be cooperatively implemented by other units and may be cooperatively implemented by a plurality of units.

According to another embodiment of this disclosure, a computer program (including program code) that can perform the steps in the corresponding method shown in FIG. 2 or FIG. 4 may run on a general computing device, such as a computer, which include processing elements and storage elements such as a central processing unit (CPU), a random access memory (RAM), and a read-only memory (ROM), to construct the video editing apparatus shown in FIG. 7, and implement the video editing method in the embodiments of this disclosure. The computer program may be recorded in, for example, a non-transitory computer readable recording medium, and may be loaded into the foregoing computing device by using the non-transitory computer readable recording medium, and run in the computing device.

In the embodiments of this disclosure, for a to-be-edited target video, attribute recognition may be performed on an object included in the target video by invoking a deep learning model, to relatively accurately obtain attribute information of the object included in the target video. Therefore, a target object satisfying an editing requirement may be relatively accurately selected according to the attribute information of the object included in the target video, a plurality of groups of pictures associated with the target object are automatically edited from the target video, and an edited video corresponding to the target video may be automatically generated by using the plurality of groups of pictures. As can be seen, in the embodiments of this disclosure, video may be automatically edited through a deep learning technology. In an entire video editing process, no user needs to participate in the process, so that time costs and labor costs may be effectively saved, thereby effectively improving the video editing efficiency.

Figure 8:
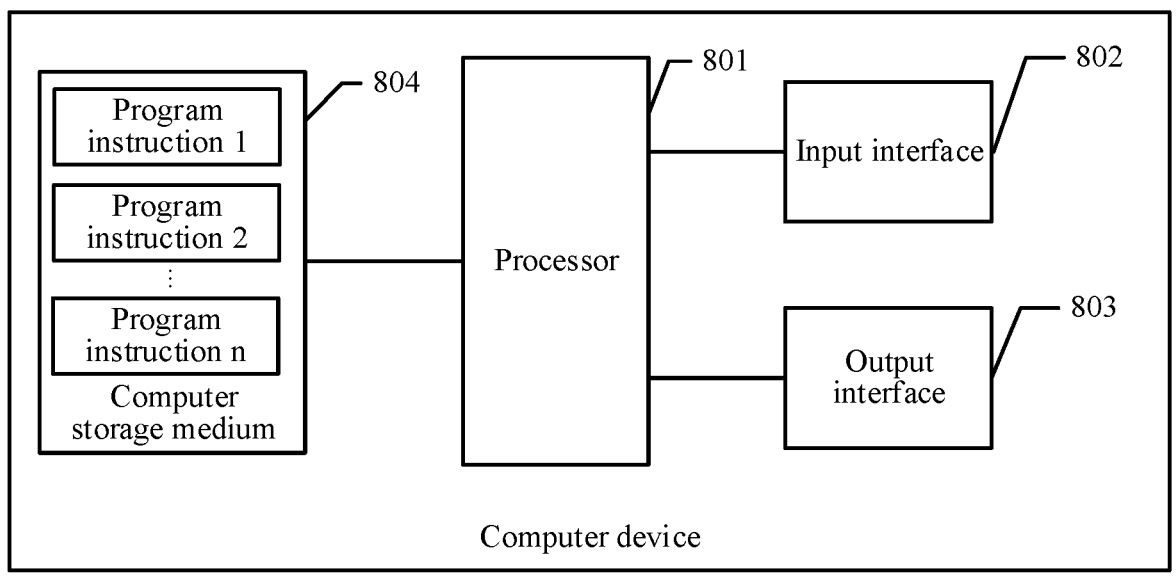
FIG. 8 is a schematic structural diagram of an example computer device according to an embodiment of this disclosure.

Based on the descriptions of the foregoing method embodiments and apparatus embodiments, some embodiments of this disclosure further provide a computer device. Referring to FIG. 8, the computer device includes at least a processor 801, an input interface 802, an output interface 803, and a computer storage medium 804. The processor 801, the input interface 802, the output interface 803, and the computer storage medium 804 in the computer device may be connected by a bus or in another manner.

The computer storage medium 804 may be stored in a memory of the computer device. The computer storage medium 804 is configured to store a computer program. The computer program includes program instructions. The processor 801 is configured to execute the program instructions stored in the computer storage medium 804. The processor 801 (or referred to as a CPU) is a computing core and a control core of the computer device, is suitable for implementing one or more instructions, and is suitable for loading and executing one or more instructions to implement a corresponding method procedure or a corresponding function. In some embodiments, the processor 801 described in this embodiment of this disclosure may be configured to perform a series of video editing processing, which includes: invoking a deep learning model to perform attribute recognition on an object included in a target video to obtain attribute information of the object, the deep learning model being a model having an attribute recognition capability and obtained by performing model training through a deep learning technology; selecting, according to the attribute information of the object, a target object satisfying an editing requirement from the object included in the target video; and obtaining a plurality of groups of pictures associated with the target object from the target video through editing, and generating an edited video corresponding to the target video by using the plurality of groups of pictures.

In the embodiments of this disclosure, a computer storage medium is further provided, and the computer storage medium is a memory device in the computer device and is configured to store programs and data. It may be understood that the computer storage medium herein may include an internal storage medium of the computer device and may also include an extended storage medium supported by the computer device. The computer storage medium provides storage space, and the storage space stores an operating system of the computer device. In addition, the storage space further stores one or more instructions suitable to be loaded and executed by the processor 801. The instructions may be one or more computer programs (including program code). The computer storage medium herein may be a high-speed RAM memory, or may be a non-volatile memory, such as at least one magnetic disk storage. Optionally, the computer storage medium may be at least one computer storage medium far away from the foregoing processor. In some embodiments, the processor 801 may load and execute the one or more instructions stored in the computer storage medium, to implement the method steps in the embodiments of the video editing method shown in FIG. 2 or FIG. 4.

In the embodiments of this disclosure, for a to-be-edited target video, attribute recognition may be performed on an object included in the target video by invoking a deep learning model, to relatively accurately obtain attribute information of the object included in the target video. Therefore, a target object satisfying an editing requirement may be relatively accurately selected according to the attribute information of the object included in the target video, a plurality of groups of pictures associated with the target object are automatically edited from the target video, and an edited video corresponding to the target video may be automatically generated by using the plurality of groups of pictures. As can be seen, in the embodiments of this disclosure, video may be automatically edited through a deep learning technology. In an entire video editing process, no user needs to participate in the process, so that time costs and labor costs may be effectively saved, thereby effectively improving the video editing efficiency.

According to some embodiments of this disclosure, a computer program product or a computer program is provided, the computer program product or the computer program including computer instructions, the computer instructions being stored in a non-transitory computer-readable storage medium. A processor of a computer device reads the computer instructions from the non-transitory computer-readable storage medium, and executes the computer instructions, so that the computer device performs the method provided in the implementations in the foregoing examples of the embodiments of the video editing method shown in FIG. 2 or FIG. 4.

In addition, the foregoing disclosure are merely example embodiments of this disclosure, and are not intended to limit scope of this disclosure. Therefore, equivalent variations made in accordance with the claims of this application shall fall within the scope of this disclosure.

What is claimed is:

1. A deep learning-based video editing method comprising:
    identifying a plurality of objects in a target video;
    obtaining attribute information for each of the plurality of objects in the target video using a deep learning model, the deep learning model having an attribute recognition capability, wherein the obtaining attribute information for each of the plurality of objects comprises determining a plurality of facial features for each of the plurality of objects and a corresponding facial time mark for each of the plurality of facial features;
    calculating an object frequency for each of the plurality of objects based on a total number of the facial time marks for each of the plurality of objects;
    selecting a target object from the plurality of objects based on the object frequency that satisfies an editing requirement of the target video;
    obtaining a plurality of groups of pictures associated with the target object from the target video using editing; and
    generating an edited video corresponding to the target video using the plurality of groups of pictures associated with the target object.

2. The method according to claim 1, wherein the obtaining a plurality of groups of pictures further comprises:
    performing low-quality picture detection processing on the target video to obtain a low-quality picture of the target video;
    filtering out the low-quality picture from the target video to obtain an effective video; and
    obtaining the plurality of groups of pictures associated with the target object from the effective video using editing.

3. The method according to claim 2, wherein the low-quality picture comprises at least one of a blurred picture determined based on a picture definition, a repeated picture, or a group picture comprising the plurality of objects.

4. The method according to claim 3, wherein the low-quality picture further comprising the blurred picture, and the performing low-quality picture detection processing further comprises:
   obtaining a dynamic definition threshold adapted to the target video;
   traversing each frame of the target video;
   performing convolution processing on a traversed current picture to obtain a convolved picture;
   performing a mean operation on each pixel value of the convolved picture;
   calculating a picture definition of the traversed current picture based on a mean obtained using the mean operation and a difference between the pixel values; and
   defining the traversed current picture as the blurred picture when the picture definition of the current picture is less than the dynamic definition threshold.

5. The method according to claim 3, wherein the target video is obtained using photographing by a plurality of cameras, the low-quality picture further comprises the blurred picture, and the performing low-quality picture detection further comprises:
   obtaining a dynamic definition threshold adapted to the target video;
   splitting the target video into a plurality of storyboard segments;
   traversing the plurality of storyboard segments, wherein each frame in one of the plurality of storyboard segments is photographed by a same camera of the plurality of cameras;
   calculating a picture definition of each frame in a traversed current storyboard segment;
   calculating a segment definition of the traversed current storyboard segment based on the picture definition of each frame in the traversed current storyboard segment; and
   defining each frame in the traversed current storyboard segment as the blurred picture when the segment definition is less than the dynamic definition threshold.

6. The method according to claim 4, wherein the obtaining the dynamic definition threshold further comprises:
   performing picture sampling processing on the target video to obtain K frames of sampled pictures;
   calculating a picture definition of each frame of the K frames of the sampled pictures; and
   calculating the dynamic definition threshold adapted to the target video based on a threshold calculation strategy and the picture definition of each frame of the K frames, wherein the threshold calculation strategy is used for instructing to rearrange each frame of the sampled pictures in descending order of the picture definition of each frame of the K frames, and using a picture definition of a $K^{th}$ sampled picture after rearrangement as the dynamic definition threshold, and $k \in [1, K]$ or using a mean of the picture definition of each frame of the K frames as the dynamic definition threshold.

7. The method according to claim 5, wherein the obtaining the dynamic definition threshold further comprises:
   performing picture sampling processing on the target video to obtain K frames of sampled pictures;
   calculating a picture definition of each frame of the K frames of the sampled pictures; and
   calculating the dynamic definition threshold adapted to the target video based on a threshold calculation strategy and the picture definition of each frame of the K frames, wherein the threshold calculation strategy is used for instructing to rearrange each frame of the sampled pictures in descending order of the picture definition of each frame of the K frames, and using a picture definition of a $K^{th}$ sampled picture after rearrangement as the dynamic definition threshold, and $k \in [1, K]$ or using a mean of the picture definition of each frame of the K frames as the dynamic definition threshold.

8. The method according to claim 1, wherein the deep learning model is obtained by performing model training through using a deep learning technology.

9. The method according to claim 3, wherein the facial time mark indicates a picture to which the object belongs when a corresponding facial feature is recognized from the target video; and
   the low-quality picture further comprising the repeated picture, and the performing low-quality picture detection processing further comprising:
   traversing the object and arranging the facial features of a traversed current object based on an ascending order of facial time marks;
   traversing the arranged facial features sequentially and selecting a second facial feature from the facial features that have not been selected after a traversed first facial feature;
   calculating a facial similarity between the traversed first facial feature and the second facial feature and a playing time difference between a first picture and a second picture, wherein the first picture is indicated by a facial time mark of the first facial feature and the second picture is indicated by a facial time mark of the second facial feature; and
   defining the second picture as the repeated picture when the facial similarity is greater than a threshold and the playing time difference is less than a time difference threshold; or otherwise, reselecting the second facial feature.

10. The method according to claim 3, wherein the target video is obtained using photographing by a plurality of cameras, the low-quality picture further comprises the repeated picture, and the performing low-quality picture detection further comprising:
   splitting the target video into a plurality of storyboard segments, wherein the plurality of storyboard segments are arranged based on an appearance sequence in the target video and each frame in one of the plurality of storyboard segments is photographed by a same camera of the plurality of cameras;
   traversing the plurality of storyboard segments;
   selecting a reference storyboard segment from the plurality of storyboard segments that have not been selected after a traversed current storyboard segment;
   calculating a segment similarity between the traversed current storyboard segment and the reference storyboard segment; and
   defining each frame in the reference storyboard segment as the repeated picture when the segment similarity is greater than a threshold; or otherwise, reselecting the reference storyboard segment.

11. The method according to claim 3, wherein each of the plurality of groups of pictures comprises a video sub-segment, and the obtaining the plurality of groups of pictures further comprising:
obtaining target music and performing rhythm detection on the target music to obtain rhythm point locations;
splitting the target music into M music segments based on the rhythm point locations, wherein a playing starting point or a playing ending point of each of the M music segments is a rhythm point location; and
traversing the M music segments and obtaining a video sub-segment associated with the target object from the effective video using editing based on a playing duration of a traversed current music segment.

12. The method according to claim 1, the generating an edited video further comprising:
obtaining target music for the target video;
determining rhythm-synchronized video segments associated with music segments in the target music based on the plurality of groups of pictures, wherein a playing duration of the rhythm-synchronized video segment is equal to a playing duration of an associated music segment, the target music comprises M music segments, and a playing starting point or a playing ending point of each music segment is a rhythm point location;
splicing the rhythm-synchronized video segments associated with the music segments based on an arrangement sequence of the music segments to obtain a spliced video; and
performing background music adding processing on the spliced video using the target music to obtain the edited video.

13. The method according to claim 12, the determining rhythm-synchronized video segments further comprising:
selecting, when each group in the plurality of groups of pictures comprises a video sub-segment, and based on a playing duration of each group in the plurality of groups of pictures, a video sub-segment playing duration is equal to a playing duration of an $m^{th}$ music segment from the plurality of groups of pictures as the rhythm-synchronized video segment associated with the $m^{th}$ music segment, wherein $m \in [1, M]$; and
selecting, when each group in the plurality of groups of pictures comprises a frame, a target picture matching the $m^{th}$ music segment from the plurality of groups of pictures, generating a static video segment through the target picture, and using the static video segment as the rhythm-synchronized video segment associated with the $m^{th}$ music segment, wherein each frame in the static video segment is the target picture, and a playing duration of the static video segment is equal to the playing duration of the $m^{th}$ music segment.

14. The method according to claim 1, the attribute information of at least one of the plurality of objects comprising at least one of the following: facial information, action information, or emotion information, and the selecting the target object further comprising:
calculating an object frequency of each of the plurality of objects based on the facial information of the object when the editing requirement instructs to select the object with the object frequency higher than a frequency threshold or select an object with a highest object frequency, and selecting the object with the object frequency higher than the frequency threshold from the plurality of objects as a target object, or selecting the object having the highest object frequency from the plurality of objects as the target object;
selecting a first object group from the plurality of objects based on the action information of the object when the editing requirement instructs to select the object performing a common action or select the object performing a preset action, and using objects in the first object group as the target object, wherein the objects in the first object group perform the common action; or selecting the object performing the preset action based on the action information of the object from the plurality of objects as the target object; and
selecting a second object group from the plurality of objects based on the emotion information of the object when the editing requirement instructs to select the object having a common emotion state or select the object having a preset emotion state, and using objects in the second object group as the target object, wherein the objects in the second object group have the common emotion state; or selecting the object having the preset emotion state based on the emotion information of the object from the plurality of objects as the target object.

15. The method according to claim 14, wherein,
when the target object is selected based on the facial information, each group in the plurality of groups of pictures comprises the target object;
when the target object is selected based the action information, the plurality of groups of pictures comprise a group of pictures comprising the target object performing the common action or the preset action; and
when the target object is selected based on the emotion information, the plurality of groups of pictures comprise a group of pictures comprising the target object having the common emotion state or the preset emotion state.

16. The method according to claim 14, wherein,
the deep learning model comprises a first model and a second model;
the facial information and the emotion information are obtained using recognition by the first model, the first model being a network model constructed and trained based on a deep convolutional neural network and configured to perform attribute recognition on each frame in the target video; and
the action information is obtained using recognition by the second model, the second model being a slow-fast-combined network model constructed and trained based on a target slow and fast detection algorithm and configured to perform action recognition on a picture sub-sequence in the target video.

17. The method according to claim 1, the editing requirement of the target video being a first editing requirement of the target video, the method further comprising:
setting a second editing requirement of the target video, the second editing requirement being different than the first editing requirement; and
automatically selecting a second target object from the plurality of objects and generating a second edited video corresponding to the second editing requirement.

18. The method according to claim 1, wherein the deep learning model comprises a first model and a second model, wherein the second model comprises a low frame rate channel network, a high frame rate channel network, and a prediction layer, the method further comprising:
inputting a low frame rate first picture sequence to the low frame rate channel network, wherein the low frame rate first picture sequence comprises spatial semantic information and static content;

inputting a high frame rate second picture sequence to the high frame rate channel network, wherein the high frame rate second picture sequence comprises motion information and dynamic content; and performing action prediction information with the prediction layer based on an output result of the low frame rate channel network and an output result of the high frame rate channel network to output an action feature an action time mark of the action feature.

19. A deep learning-based video editing apparatus comprising at least one processor and at least one memory, the at least one memory storing at least one program code, the at least one program code being loaded and executed by the at least one processor to:

identify a plurality of objects in a target video;

obtain attribute information for each of the plurality of objects in the target video using a deep learning model, the deep learning model having an attribute recognition capability, wherein the obtaining attribute information for each of the plurality of objects comprises determining a plurality of facial features for each of the plurality of objects and a corresponding facial time mark for each of the plurality of facial features;

calculate an object frequency for each of the plurality of objects based on a total number of the facial time marks for each of the plurality of objects;

select a target object from the plurality of objects based on the object frequency that satisfies an editing requirement of the target video;

obtain a plurality of groups of pictures associated with the target object from the target video through editing; and generate an edited video corresponding to the target video using the plurality of groups of pictures associated with the target object.

20. A non-transitory computer-readable storage medium, storing at least one instruction, at least one program, a code set, or an instruction set, the at least one instruction, the at least one program, the code set, or the instruction set being loaded and executed by at least one processor, causing the at least one processor to perform a deep learning-based video editing method comprising:

identifying a plurality of objects in a target video;

obtaining attribute information for each of the plurality of objects in the target video using a deep learning model, the deep learning model having an attribute recognition capability, wherein the obtaining attribute information for each of the plurality of objects comprises determining a plurality of facial features for each of the plurality of objects and a corresponding facial time mark for each of the plurality of facial features;

calculating an object frequency for each of the plurality of objects based on a total number of the facial time marks for each of the plurality of object;

selecting a target object from the plurality of objects based on the object frequency that satisfies an editing requirement of the target video;

obtaining a plurality of groups of pictures associated with the target object from the target video using editing; and generating an edited video corresponding to the target video using the plurality of groups of pictures associated with the target object.

* * * * *